United States Patent
Murakami

(10) Patent No.: US 9,744,866 B2
(45) Date of Patent: Aug. 29, 2017

(54) ELECTRIC POWER CONTROL DEVICE

(71) Applicant: SHARP KABUSHIKI KAISHA, Osaka-shi, Osaka (JP)

(72) Inventor: Kohzaburoh Murakami, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 168 days.

(21) Appl. No.: 14/725,265

(22) Filed: May 29, 2015

(65) Prior Publication Data
US 2015/0343915 A1  Dec. 3, 2015

(30) Foreign Application Priority Data

May 30, 2014 (JP) ................. 2014-112366

(51) Int. Cl.
*B60L 11/18* (2006.01)
*H01R 13/639* (2006.01)
*H01R 13/66* (2006.01)
*H01R 13/627* (2006.01)

(52) U.S. Cl.
CPC ...... *B60L 11/1818* (2013.01); *H01R 13/6395* (2013.01); *H01R 13/6633* (2013.01); *H01R 13/6272* (2013.01); *Y02T 10/7005* (2013.01); *Y02T 90/14* (2013.01); *Y10T 307/858* (2015.04)

(58) Field of Classification Search
CPC ............. G07C 9/00182; B60L 11/1818; B60L 2230/40; B60L 2270/32; H01R 13/6397; H02J 9/06
USPC ....................... 307/10.1, 10.2, 130
See application file for complete search history.

(56) References Cited

U.S. PATENT DOCUMENTS

| | | | | |
|---|---|---|---|---|
| 4,249,170 A | * | 2/1981 | Cham | H02H 7/04 324/547 |
| 4,262,320 A | * | 4/1981 | Herron | H02M 7/53871 327/405 |
| 2009/0255787 A1 | * | 10/2009 | Rane | H01H 71/12 200/43.16 |
| 2009/0286414 A1 | * | 11/2009 | Ohtomo | H01R 13/6397 439/299 |
| 2010/0228405 A1 | * | 9/2010 | Morgal | B62H 3/02 701/2 |

(Continued)

FOREIGN PATENT DOCUMENTS

| | | |
|---|---|---|
| JP | 2003-165416 A | 6/2003 |
| JP | 2011-165609 A | 8/2011 |

(Continued)

*Primary Examiner* — Thienvu Tran
*Assistant Examiner* — David M Stables
(74) *Attorney, Agent, or Firm* — Birch, Stewart, Kolasch & Birch, LLP

(57) ABSTRACT

An electric power control device has a first connector connected to a second connector provided in a second appliance, and a control circuit provided within a first appliance that exchanges electric power with the second appliance via a harness and connected to the first connector via the harness. The first connector includes a latching solenoid that switches connector connection, i.e., connection between the first and second connectors, between a locked state and an unlocked state. The control circuit outputs a first or second voltage to an operating coil inside the latching solenoid to bring the connector connection into the locked or unlocked state, respectively.

6 Claims, 9 Drawing Sheets

(56) References Cited

U.S. PATENT DOCUMENTS

2013/0241680 A1* 9/2013 Hanchett, Jr. ......... H01F 7/1615
335/234

FOREIGN PATENT DOCUMENTS

| JP | 2012-130127 A | 7/2012 |
| JP | 2012-243565 A | 12/2012 |

* cited by examiner

CONNECTOR-DISCONNECTED STATE

CONNECTOR-CONNECTED STATE
(UNLOCKED, WITH LATCHING SOLENOID RESET)

ELECTRIC POWER CONTROL DEVICE

This nonprovisional application claims priority under 35 U.S.C. §119(a) on Patent Application No. 2014-112366 filed in Japan on May 30, 2014, the entire contents of which are hereby incorporated by reference.

BACKGROUND OF THE INVENTION

1. Field of the Invention

The present invention relates to electric power control devices.

2. Description of Related Art

As an appliance for charging a battery incorporated in an electric vehicle, PCSs (power control systems) are used. PCSs are installed, for example, at power supply stands and at households. A user who operates a PCS connects a first connector, which is connected to the PCS, to a second connector, which is provided on an electric vehicle, to make the PCS charge the battery.

During the charging of the battery, a comparatively high voltage is applied to the first and second connectors. Thus, with a view to preventing the first connector from being pulled out of the second connector during power transfer, it is common to adopt a mechanism that locks the connection between the first and second connectors. For example, Japanese patent application published No. 2012-130127 (hereinafter referred to as Patent Document 1) discloses a configuration that employs a solenoid (non-latching solenoid) so that the connector connection remains locked so long as the solenoid is energized.

What is important is that the operator is not exposed to danger when pulling the first connector out of the second connector. To that end, cooperation is necessary between the circuit inside the PCS and the first connector, the latter practically prohibiting or permitting connector insertion and extraction. Technology for achieving such a function with a simple configuration and/or with high reliability has been sought. Some PCSs also have a function of receiving the discharge electric power of a battery on an electric vehicle to supply the discharge electric power to another load. When this function is used, the first connector connected to the PCS serves as a receipt connector, and the second connector provided on the electric vehicle serves as a supply connector.

SUMMARY OF THE INVENTION

An object of the present invention is to provide an electric power control device that allows locking and unlocking of connector connection with a simple configuration and/or with high reliability.

According to one aspect of the present invention, an electric power control device includes: a first connector which is connected to a second connector provided in a second appliance; and a control circuit which is provided within a first appliance that exchanges electric power with the second appliance via a harness, and which is connected to the first connector via the harness. Here, the first connector includes a latching solenoid that switches connector connection, i.e., connection between the first and second connectors, between a locked state and an unlocked state. Moreover, the control circuit outputs a predetermined first voltage to an operating coil inside the latching solenoid to bring the connector connection into the locked state, and outputs a predetermined second voltage to the operating coil to bring the connector connection into the unlocked state.

According to the present invention, it is possible to provide an electric power control device that allows locking and unlocking of connector connection with a simple configuration and/or with high reliability.

DETAILED DESCRIPTION OF PREFERRED EMBODIMENTS

Hereinafter, examples of embodiment of the present invention will be described specifically with reference to the accompanying drawings. Among the drawings referred to in the course, the same parts are identified by the same reference signs, and in principle no overlapping description of the same parts will be repeated. In the present specification, for simplicity's sake, symbols and signs referring to information, signals, physical quantities, states, members, etc. are occasionally used with the names of the corresponding information, signals, physical quantities, states, members, etc. omitted or abbreviated.

Basic Configuration

Figure 1:
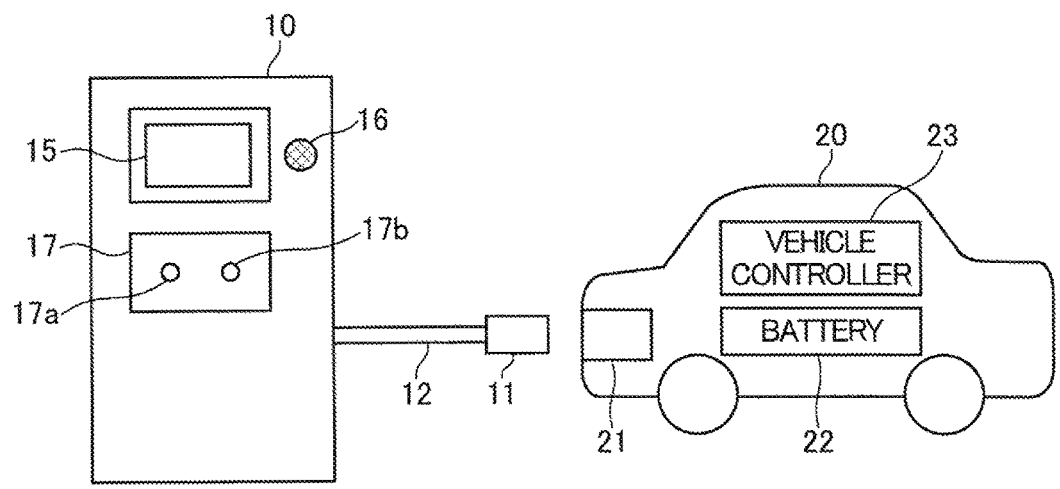
FIG. 1 is a schematic configuration diagram of a PCS and an electric vehicle embodying the present invention.
Figure 2:
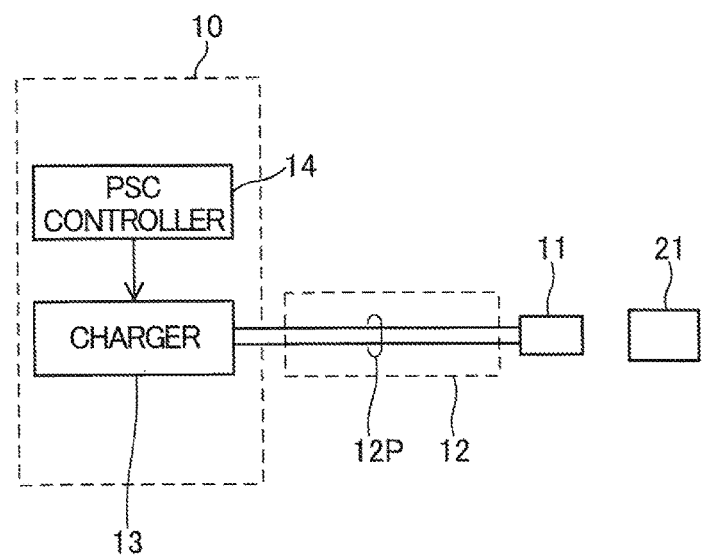
FIG. 2 is a diagram showing a part of the internal configuration of a PCS.

FIG. 1 is a schematic configuration diagram of a PCS (power control system) 10 and an electric vehicle 20 according to an embodiment of the present invention. FIG. 2 shows a part of the internal configuration of the PCS 10. The PCS 10 includes a first connector 11, a harness (cable) 12, a charger 13 connected to a pair of power lines 12P inside the harness 12, a PCS controller 14 for controlling the charger 13, a display screen 15, a loudspeaker 16, and an operation panel 17 having a START button 17a and a STOP button 17b. The electric vehicle 20 includes a second connector 21, a battery 22 comprising a secondary battery, and a vehicle controller 23 comprising a microprocessor or the like, and can run by use of the output voltage of the battery 22. For the time being, a case will be considered where electric power is transferred from the PCS 10 to the electric vehicle 20. Accordingly, the first and second connectors 11 and 21 are referred to also as a supply connector 11 and a receipt connector 21 respectively, and the harness 12 and the power lines 12P are referred to also as a supply harness 12 and supply power lines 12P respectively.

The supply connector 11 and the receipt connector 21 are configured to be connectable to each other. With the supply connector 11 and the receipt connector 21 connected together, when the charger 13 outputs a supply voltage, which is a high voltage, to the pair of supply power lines 12P, the supply voltage is supplied to power terminals inside the receipt connector 21. Thus, the battery 22 is charged based on the supply voltage via the power terminals.

The display screen 15 comprises a liquid crystal display or the like, and can display various images under the control of the PCS controller 14. The loudspeaker 16 can reproduce various sounds under the control of the PCS controller 14. The operation panel 17 accepts various operations by a user as an operator.

Inside the harness 12 is laid, in addition to the supply power lines 12P, a communication line, and through the communication line, the PCS controller 14 and the vehicle controller 23 exchanges various kinds of information between them. Inside the harness 12 are laid other lines (conductors), which will be described later.

Figure 3:
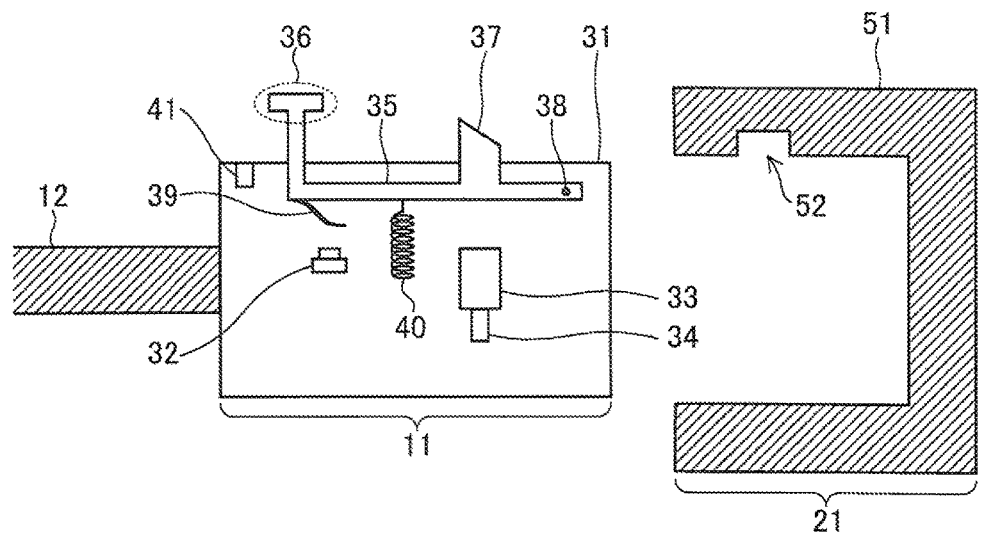
FIG. 3 is a sectional view of a supply connector, a receipt connector, and a harness in a state where the supply connector is not inserted in the receipt connector.
Figure 4:
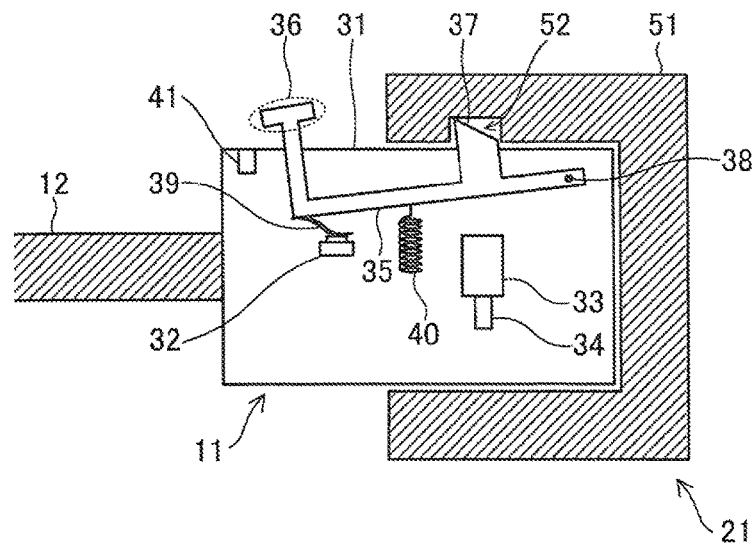
FIG. 4 is a sectional view of a supply connector, a receipt connector, and a harness in a state where the supply connector is inserted in the receipt connector and the latching solenoid is reset.
Figure 5:
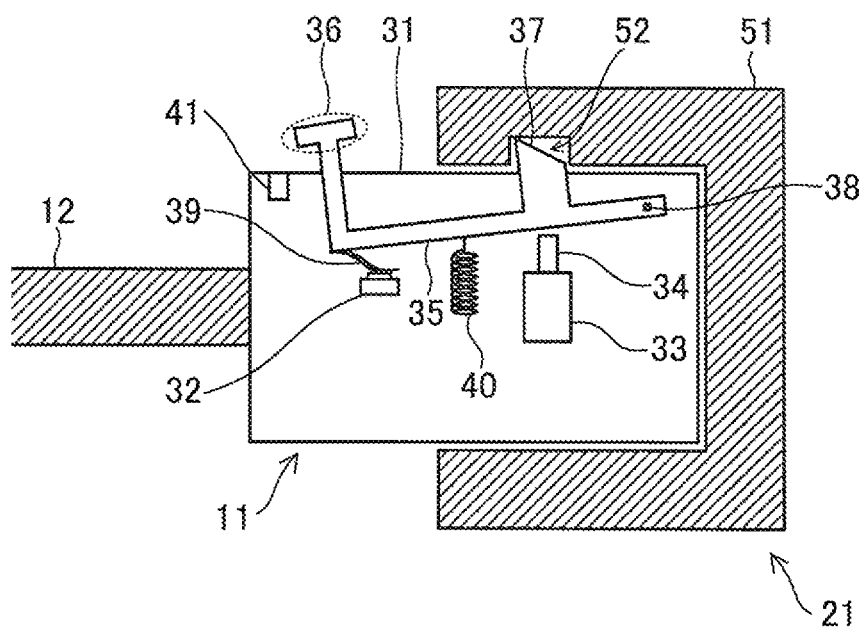
FIG. 5 is a sectional view of a supply connector, a receipt connector, and a harness in a state where the supply connector is inserted in the receipt connector and the latching solenoid is set.

The receipt connector 21 is a female-type connector (i.e., inlet), whereas the supply connector 11 is a male-type connector. Accordingly, inserting the supply connector 11 into receipt connector 21 achieves connection between the connectors 11 and 21. FIGS. 3 to 5 are sectional view of the connectors 11 and 21 and the harness 12 as seen from a direction perpendicular to their insertion direction. FIG. 3 is a sectional view of them before insertion, and FIGS. 4 and 5 are sectional views of them after insertion. While cut parts in sectional views are generally hatched or otherwise indicated, in FIGS. 3 to 5, no such indications are applied with respect to the supply connector 11 for the sake of simple illustration. In the following description, a state where the supply connector 11 is not inserted in the receipt connector 21 and thus the connectors 11 and 21 are not connected together is referred to as the connector-disconnected state, and a state where the supply connector 11 is inserted in the receipt connector 21 and thus the connectors 11 and 21 are connected together is referred to as the connector-connected state.

The supply connector 11 has a housing 31 formed of resin or the like, and a microswitch 32 and a latching solenoid 33 each stationarily arranged in a predetermined position inside the housing 31. The latching solenoid 33 has an operating coil (unillustrated in FIGS. 3 to 5) and a moving iron core 34. Also housed inside the supply connector 11 is an operated member 35 substantially in the shape of the letter L, and one end of the operated member 35 is fastened to the housing 31 so as to be pivotal about a shaft 38. At the other end of the operated member 35, a button 36 is formed which the operator can press in. On a part of the operated member 35, a protrusion 37 is formed. The protrusion 37 protrudes out of the housing 31.

In the connector-disconnected state, as shown in FIG. 3, no external force acts on either the button 36 or the protrusion 37; thus, a spring 40 provided inside the housing 31 keeps the operated member 35 in a position swung upward in the figure about the shaft 38, thereby leaving the operated member 35 in a predetermined reference position. The operated member 35 is fitted with a leaf spring 39 for pressing the microswitch 32 in to turn it on, and in the connector-disconnected state shown in FIG. 3, the leaf spring 39 is out of contact with the microswitch 32, and thus the microswitch 32 remains off. The housing 31 further has an indicator 41 arranged in a position where it is visible to the user.

On the other hand, the receipt connector 21 has a box-shaped housing 51 which has a space inside it for accommodating the housing 31. When the housing 31 is inserted in the housing 51, and a plurality of terminals (unillustrated) fixed to the housing 31 and a plurality of terminals (unillustrated) fixed inside the housing 51 are electrically connected together, connection between the connectors 11 and 21 is achieved. In the inner face of the housing 51, a recess 52 is provided with which the protrusion 37 engages when the housing 31 is inserted in the housing 51. Starting with a state before the insertion of the housing 31 into the housing 51, inserting the housing 31 gradually into the housing 51 first causes the protrusion 37 to hit an end of the inner wall of the housing 51; inserting the housing 31 further into the housing 51 causes, owing to the inclination provided on the protrusion 37, a force to act on the protrusion 37 so as to press it in downward in FIG. 3; thus, the operated member 35 swings downward in the drawing, and meanwhile the housing 31 continues being inserted into the housing 51. When the housing 31 has been inserted across a predetermined stroke until the protrusion 37 reaches the recess 52, the force pressing the protrusion 37 in downward in FIG. 3 lessens, and thus, under the force of the spring 40, the protrusion 37 engages with the recess 52.

FIGS. 4 and 5 show states where the protrusion 37 is engaged with the recess 52, the states both corresponding to the connector-connected state. In the connector-connected state, the leaf spring 39 keeps the microswitch 32 pressed in and thereby keeps it on.

In the following description, the connection between the supply connector 11 and the receipt connector 21 in the connector-connected state is referred to as "connector connection." According to the position of the moving iron core 34, the connector connection can be in a locked state or in an unlocked state. FIG. 4 shows the connector connection in the unlocked state, and FIG. 5 shows the connector connection in the locked state.

Applying a predetermined set voltage to the operating coil of the latching solenoid 33 brings the latching solenoid 33 into a set state. In the set state, as shown in FIG. 5, the moving iron core 34 protrudes in a first direction out of the case of the latching solenoid 33 which is fastened to the housing 31. The first direction points from the case of the latching solenoid 33 toward the protrusion 37. With the moving iron core 34 protruding in the first direction (i.e., with the latching solenoid 33 in the set state), the connector connection is in the locked state. Bringing the latching solenoid 33 into the set state is occasionally referred to simply as setting the latching solenoid 33.

Applying a predetermined reset voltage to the operating coil of the latching solenoid 33 brings the latching solenoid 33 into a reset state. In the reset state, as shown in FIG. 4, the moving iron core 34 protrudes in a second direction out of the case of the latching solenoid 33 which is fastened to the housing 31. The second direction is opposite to the first direction. With the moving iron core 34 protruding in the second direction (i.e., with the latching solenoid 33 in the reset state), the connector connection is in the unlocked state. Bringing the latching solenoid 33 into the reset state is occasionally referred to simply as resetting the latching solenoid 33.

With the connector connection in the unlocked state (FIG. 4), by pressing the button 36 in toward the housing 31, the operator can put the protrusion 37 out of the recess 52. Then, with the button 36 held in, by pulling the housing 31 (supply connector 11) out of the housing 51 (receipt connector 21), the operator can bring the connectors 11 and 21 into the connector-disconnected state.

On the other hand, with the connector connection in the locked state (FIG. 5), even if the operator tries to press the button 36 in, the operated member 35 hits the moving iron core 34, and the button 36 cannot be pressed so far in as to put the protrusion 37 out of the recess 52. Thus, in the locked state, engagement between the protrusion 37 and the recess 52 is maintained, and this prevents the operator from pulling the housing 31 (supply connector 11) out of the housing 51 (receipt connector 21).

The latching solenoid 33 is a solenoid of a latchable type, meaning that it can be latched either in a set state or in a reset state. Accordingly, in the connector-connected state, once a set voltage is applied to the operating coil, unless a reset voltage is applied to the operating coil, the locked state is maintained; likewise, once a reset voltage is applied to the operating coil, unless a set voltage is applied to the operating coil, the unlocked state is maintained. In the following description, unless otherwise stated, it is assumed that the supply connector 11 and the receipt connector 21 are in the connector-connected state.

The indicator 41 provided on the supply connector 11 indicates to the operator whether or not the connector connection is in the locked state. For example, in a case where the indicator 41 comprises an LED (light-emitting diode), the PCS controller 14 drives the indicator 41 such that the indicator 41 is on in the locked state and that the indicator 41 is off in the unlocked state. The indicator 41 does not necessarily have to be an LED; it can be anything that emits light when supplied with electric power.

Now, the configuration and operation of the PCS 10, of which the basic configuration has been discussed above, will be described in more detail by way of a plurality of embodiments.

First Embodiment

Figure 6:
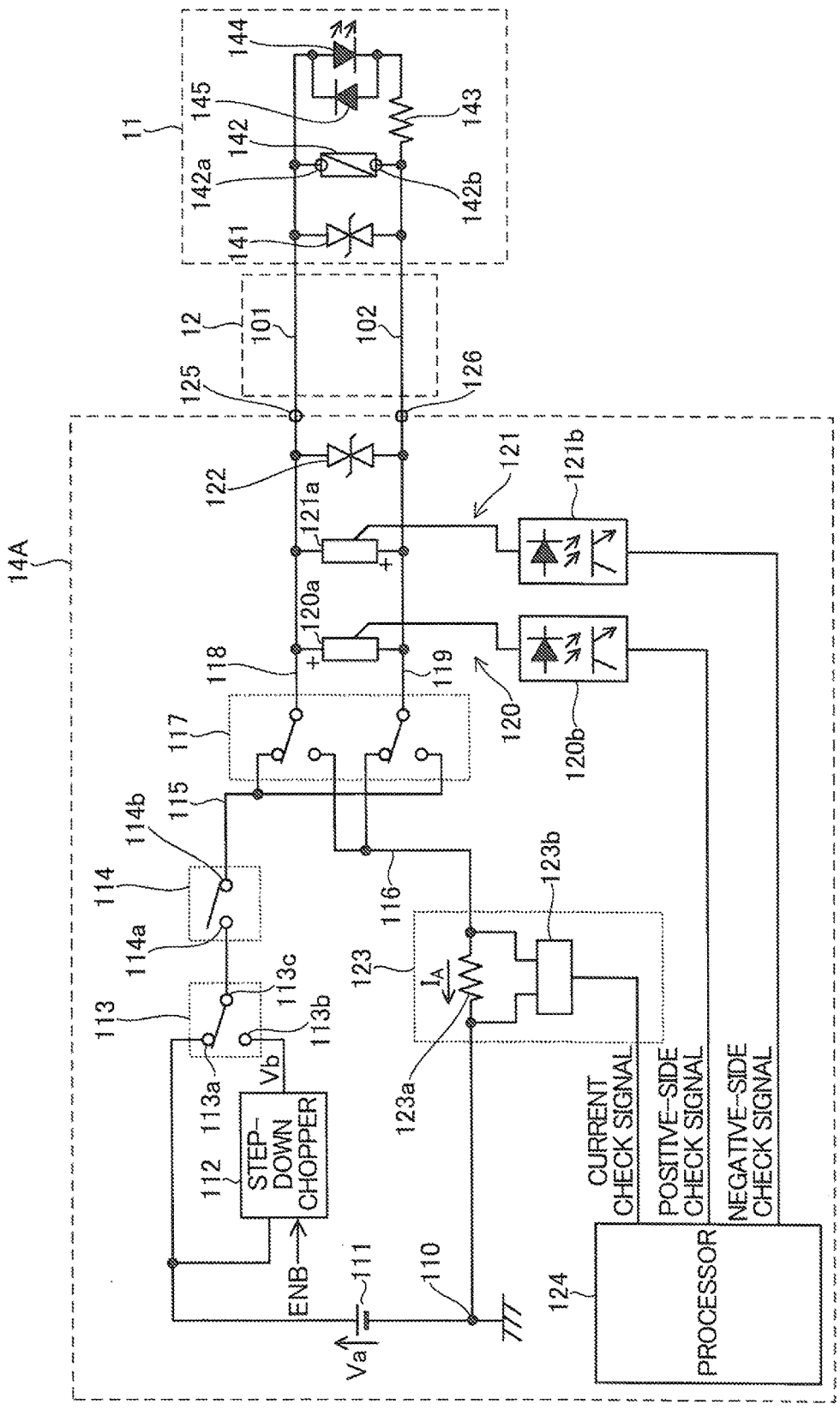
FIG. 6 is a diagram showing a part of the circuit of a PCS and the circuit inside a supply connector according to a first embodiment of the present invention.

A PCS 10 according to a first embodiment of the present invention will be described below. FIG. 6 is a diagram showing the circuit of a part of the PCS 10 and the circuit inside the supply connector 11 according to the first embodiment. In the first embodiment, the PCS controller 14 has a circuit block 14A. The circuit block 14A includes components identified by the reference signs 110 to 126. The supply connector 11 includes components identified by the reference signs 141 to 145. The harness 12 includes, in addition to the supply power lines 12P and the communication line mentioned previously, lines 101 and 102. Here, "line" is synonymous with "lead," "conductor," or the like.

A voltage source 111 outputs a predetermined positive DC (direct-current) voltage Va. A step-down chopper 112 steps down the output DC voltage of the voltage source 111 to output a positive DC voltage Vb lower than the DC voltage Va. The step-down chopper 112 receives a control signal ENB from a processor 124 so that, depending on the logic level of the control signal ENB, the step-down chopper 112 does not generate or output the DC voltage Vb. When the DC voltage Vb is unnecessary, the processor 124 can stop the operation of the step-down chopper 112 by use of the control signal ENB. In this embodiment, unless otherwise stated, the voltages Va and Vb are voltages relative to a ground potential at a reference potential point 110. Accordingly, the negative-side output terminal of the voltage source 111 is connected to the reference potential point 110, and the DC voltage Va, which is positive relative to the ground potential at the reference potential point 110, is output from the positive-side output terminal of the voltage source 111.

A switching relay 113 has an input terminal 113a for receiving the DC voltage Va, an input terminal 113b for receiving the DC voltage Vb, and an output terminal 113c to which either the input terminal 113a or 113b is connected alternatively. The processor 124 supplies the switching relay 113 with a first control signal to connect either the input terminal 113a or 113b to the output terminal 113c.

An output relay 114 has an input terminal 114a which is connected to the output terminal 113c, and an output terminal 114b which is connected to a conductor 115. The processor 124 supplies the output relay 114 with a second control signal to turn the output relay 114 on and off. When the output relay 114 is on, the terminals 114a and 114b are connected together, and thus the output voltage from the switching relay 113 (the voltage Va or Vb at the output terminal 113c) is applied to a conductor 115. When the output relay 114 is off, no voltage is applied to the conductor 115 (when the output relay 114 is off, the potential on the conductor 115 steadily equals the ground potential).

A polarity reversal relay 117 has two switching relays of a two-input one-output type that are so arranged as to connect, of the conductor 115 and a conductor 116, one to a conductor 118 and the other to a conductor 119. A state where the conductor 115 is connected to the conductor 118 and the conductor 116 is connected to the conductor 119 is referred to as a positive-polarity state, and a state where the conductor 115 is connected to the conductor 119 and the conductor 116 is connected to the conductor 118 is referred to as a negative-polarity state. The processor 124 supplies the polarity reversal relay 117 with a third control signal to switch it between the positive- and negative-polarity states. The conductor 118 is connected via a terminal 125 to the line 101 inside the harness 12, and the conductor 119 is connected via a terminal 126 to the line 102 inside the harness 12.

A voltage detector 120 detects whether or not a positive DC voltage equal to or higher than a predetermined level is applied to the conductor 118 relative to the conductor 119, and outputs a positive-side check signal (lock check signal) reflecting the result of the detection to the processor 124. The voltage detector 120 outputs a positive-side check signal with logic level "1" when a positive DC voltage equal to or higher than the predetermined level is applied to the conductor 118 relative to the conductor 119, and otherwise outputs a positive-side check signal with logic level "0." The voltage detector 120 can be composed of, for example, a block 120a for detecting the level and polarity of the voltage between the conductors 118 and 119 and a photocoupler 120b for conveying the result of the detection by the block 120a to the processor 124 in an isolated fashion.

A voltage detector 121 detects whether or not a positive DC voltage equal to or higher than a predetermined level is applied to the conductor 119 relative to the conductor 118, and outputs a negative-side check signal (unlock check signal) reflecting the result of the detection to the processor 124. The voltage detector 121 outputs a negative-side check signal with logic level "1" when a positive DC voltage equal to or higher than the predetermined level is applied to the conductor 119 relative to the conductor 118, and otherwise outputs a negative-side check signal with logic level "0." The voltage detector 121 can be composed of, for example, a block 121a for detecting the level and polarity of the voltage between the conductors 118 and 119 and a photocoupler 121b for conveying the result of the detection by the block 121a to the processor 124 in an isolated fashion. The above-mentioned predetermined levels in the voltage detectors 120 and 121 are lower than the levels of the DC voltages Va and Vb.

A surge protection element 122 clamps the voltage between the conductors 118 and 119 for protection from a surge voltage that can appear there, and thereby suppresses failure of the components inside the PCS 10.

A current detector 123 detects the value $I_A$ of the current passing through the conductor 116, and outputs a current check signal reflecting the result of the detection to the processor 124. The current detector 123 has a detection resistor 123a and a block 123b for generating a current check signal reflecting the voltage occurring across the detection resistor 123a (e.g., an amplifier for amplifying the voltage occurring across the detection resistor 123a). The conductor 116 is connected to the reference potential point 110, and the detection resistor 123a is serially inserted in the conductor 116.

The processor 124 comprises a CPU (central processing unit) or the like. While referring to the positive- and negative-side check signals, etc., the processor 124 controls the states of the relays 113, 114, and 117 and the operation of the step-down chopper 112. In the following description, unless otherwise stated, it is assumed that the DC voltage Vb is constantly applied to the input terminal 113b.

The lines 101 and 102 are connected to the individual components inside the supply connector 11 as follows. The line 101 is commonly connected to one end of a surge protection element 141, to one terminal 142a of an operating coil 142, to the anode of an LED 144, and to the cathode of a reverse voltage protection diode 145. The line 102 is commonly connected to the other end of the surge protection element 141, to the other terminal 142b of the operating coil 142, and to one end of the resistor 143, and the other end of the resistor 143 is commonly connected to the cathode of the LED 144 and to the anode of the reverse voltage protection diode 145.

The surge protection element 141 clamps the voltage between the lines 101 and 102 for protection from a surge voltage that can appear there (e.g., a surge voltage occurring in the operating coil 142) to suppress failure of the components inside the supply connector 11. A resistor 143 is for letting an adequate current pass through the LED 144 when it is lighted. The reverse voltage protection diode 145 protects the LED 144 from a reverse voltage that can appear across it. When the positive DC voltage Va or Vb is applied to the line 101 relative to the line 102, the LED 144 emits light (is driven) based on that voltage Va or Vb. The processor 124 can apply the positive DC voltage Va or Vb to the line 101 relative to the line 102 by turning the output relay 114 on and switching the polarity reversal relay 117 to the positive-polarity state.

The operating coil 142 is the operating coil of the latching solenoid 33 shown in FIGS. 3 to 5, and the LED 144 corresponds to the indicator 41 shown in FIGS. 3 to 5. The first embodiment assumes the use of a two-line latching solenoid 33. When the positive DC voltage Va is applied to the line 101 relative to the potential on the line 102, the latching solenoid 33 is set, bringing the connector connection into the locked state; when the negative DC voltage Vb is applied to the line 101 relative to the potential on the line 102 (in other words, when the positive DC voltage Vb is applied to the line 102 relative to the potential on the line 101), the latching solenoid 33 is reset, bringing the connector connection into the unlocked state. The positive DC voltage Va on the line 101 relative to the potential on the line 102 corresponds to the set voltage mentioned previously, and the negative DC voltage Vb on the line 101 relative to the potential on the line 102 corresponds to the reset voltage mentioned previously.

The processor 124 can bring the connector connection into the locked state by setting the latching solenoid 33 through a setting operation, and can bring the connector connection into the unlocked state by resetting the latching solenoid 33 through a resetting operation.

The setting operation is an operation in which the positive DC voltage Va (i.e., set voltage) is applied to the terminal 142a relative to the terminal 142b of the operating coil 142 for a predetermined period $T_{SET}$ or more. More specifically, in the setting operation, with the terminals 113a and 113c of the switching relay 113 connected together and with the polarity reversal relay 117 in the positive-polarity state, the output relay 114 is held on for the predetermined period $T_{SET}$ or more. Once the setting operation is performed, unless a resetting operation is performed, the connector connection is kept in the locked state and the latching solenoid 33 in the set state (i.e., the locked state and the set state are latched).

The resetting operation is an operation in which the negative DC voltage Vb (i.e., reset voltage) is applied to the terminal 142a relative to the terminal 142b of the operating coil 142 for a predetermined period $T_{RESET}$ or more. More specifically, in the resetting operation, with the terminals 113b and 113c of the switching relay 113 connected together and with the polarity reversal relay 117 in the negative-polarity state, the output relay 114 is held on for the predetermined period $T_{RESET}$ or more. Once the resetting operation is performed, unless a setting operation is performed, the connector connection is kept in the unlocked state and the latching solenoid 33 in the reset state (i.e., the unlocked state and the reset state are latched).

The periods $T_{SET}$ and $T_{RESET}$ each depend on the characteristics of the latching solenoid 33, and are set at, for example, several milliseconds to several tens of milliseconds.

As will be understood from the above description, the DC voltage Va is a voltage for setting the latching solenoid 33, and the DC voltage Vb is a voltage for resetting the latching solenoid 33. The DC voltage Va or Vb also serves as a voltage for lighting the LED 144. The switching relay 113 switches the voltage applied between the lines 101 and 102 between the voltages Va and Vb. The output relay 114 switches whether or not to output the voltage Va or Vb supplied via the switching relay 113 to between the lines 101 and 102. The polarity reversal relay 117 switches the polarity of the voltage supplied to between the lines 101 and 102. The voltage detectors 120 and 121 serve to check whether or not a voltage of the polarity specified by the processor 124 is applied between the conductors 118 and 119 (the actual checking is done by the processor 124). The current detector 123 serves to check whether or not a prescribed current is passing through the operating coil 142 or through the LED 144 (the actual checking is done by the processor 124).

The processor 124 can perform a positive-side check operation. In the positive-side check operation, the processor 124 controls the relays 113, 114, and 117 such that the voltage Va or Vb is applied to the input terminal 114a, that the output relay 114 is on, and that the polarity reversal relay 117 is in the positive-polarity state (in the following description, this control is referred to as the positive-side check control $J_{A1}$).

While the positive-side check control $J_{A1}$ is being performed, unless there is an a harness/circuit abnormality, a predetermined check condition $C_{A1}$ is fulfilled. The check condition $C_{A1}$ is fulfilled when the logic levels of the positive- and negative-side check signals are "1" and "0" respectively and in addition the current value $I_A$ indicated by the current check signal falls within a predetermined range $R_{A1}$; otherwise, the check condition $C_{A1}$ is not fulfilled. When the check condition $C_{A1}$ is not fulfilled, despite the positive-side check control $J_{A1}$, no current with a proper direction and level is passing through the operating coil 142. Thus, in the positive-side check operation, based on the current check signal and the positive- and negative-side check signals during the positive-side check control $J_{A1}$, the processor 124 checks whether or not the check condition $C_{A1}$ is fulfilled, and judges, if the check condition $C_{A1}$ is fulfilled, that there is no harness/circuit abnormality and, if the check condition $C_{A1}$ is not fulfilled, that there is a harness/circuit abnormality. Through the positive-side check operation, it is determined whether or not there is an abnormality in the circuitry for setting the latching solenoid 33.

The processor 124 can perform a negative-side check operation. In the negative-side check operation, the processor 124 controls the relays 113, 114, and 117 such that the voltage Va or Vb is applied to the input terminal 114a, that the output relay 114 is on, and that the polarity reversal relay 117 is in the negative-polarity state (in the following description, this control is referred to as the negative-side check control $J_{A2}$).

While the negative-side check control $J_{A2}$ is being performed, unless there is an a harness/circuit abnormality, a predetermined check condition $C_{A2}$ is fulfilled. The check condition $C_{A2}$ is fulfilled when the logic levels of the positive- and negative-side check signals are "0" and "1" respectively and in addition the current value $I_A$ indicated by the current check signal falls within a predetermined range $R_{A2}$; otherwise, the check condition $C_{A2}$ is not fulfilled. When the check condition $C_{A2}$ is not fulfilled, despite the negative-side check control $J_{A2}$, no current with a proper direction and level is passing through the operating coil 142. Thus, in the negative-side check operation, based on the current check signal and the positive- and negative-side check signals during the negative-side check control $J_{A2}$, the processor 124 checks whether or not the check condition $C_{A2}$ is fulfilled, and judges, if the check condition $C_{A2}$ is fulfilled, that there is no harness/circuit abnormality and, if the check condition $C_{A2}$ is not fulfilled, that there is a harness/circuit abnormality. Through the negative-side check operation, it is determined whether or not there is an abnormality in the circuitry for resetting the latching solenoid 33.

The current value $I_A$ indicates the value of the current passing between the lines 101 and 102 (including the current passing through the operating coil 142). On the other hand, the logic levels of the positive- and negative-side check signals reveal the polarity of the voltage applied between the lines 101 and 102, that is, the direction of the current passing through the operating coil 142. Thus, it can be said that, in the positive- and negative-side check operations, the processor 124 cooperates with the current detector 123 and the voltage detectors 120 and 121 to detect the value (current value $I_A$) and the direction of the current passing through the operating coil 142 and, based on the results of the detection, detects whether or not there is a harness/circuit abnormality. According to one specific method, referring to how the processor 124 itself is controlling the relays 113, 114, and 117, the processor 124 detects the value $I_A$ of the current passing between the lines 101 and 102 and the polarity of the voltage applied between the lines 101 and 102 and, based on the results of the detection, detects whether or not there is a harness/circuit abnormality.

A harness/circuit abnormality can be an abnormality in the harness 12, an abnormality in the control circuit of the PCS 10, or an abnormality in the circuit inside the supply connector 11.

An abnormality in the harness 12 can be a broken conductor or a short circuit in the harness 12 (in the lines 101 and 102).

The control circuit of the PCS 10 includes the circuit block 14A. For example, an abnormality in which, although the processor 124 is performing the positive-side check control $J_{A1}$, a fused contact or the like inside the polarity reversal relay 117 brings the polarity reversal relay 117 into the negative-polarity state is classified as an abnormality in the control circuit of the PCS 10. For another example, a broken conductor in the conductor 115 or 116 is classified as an abnormality in the control circuit of the PCS 10. For yet another example, an abnormal output of the voltage source 111 is classified as an abnormality in the control circuit of the PCS 10.

The circuit inside the supply connector 11 includes a circuit composed of the components identified by the reference signs 141 to 145. For example, a broken conductor in the operating coil 142 is classified as an abnormality in the circuit inside the supply connector 11.

Figure 7:
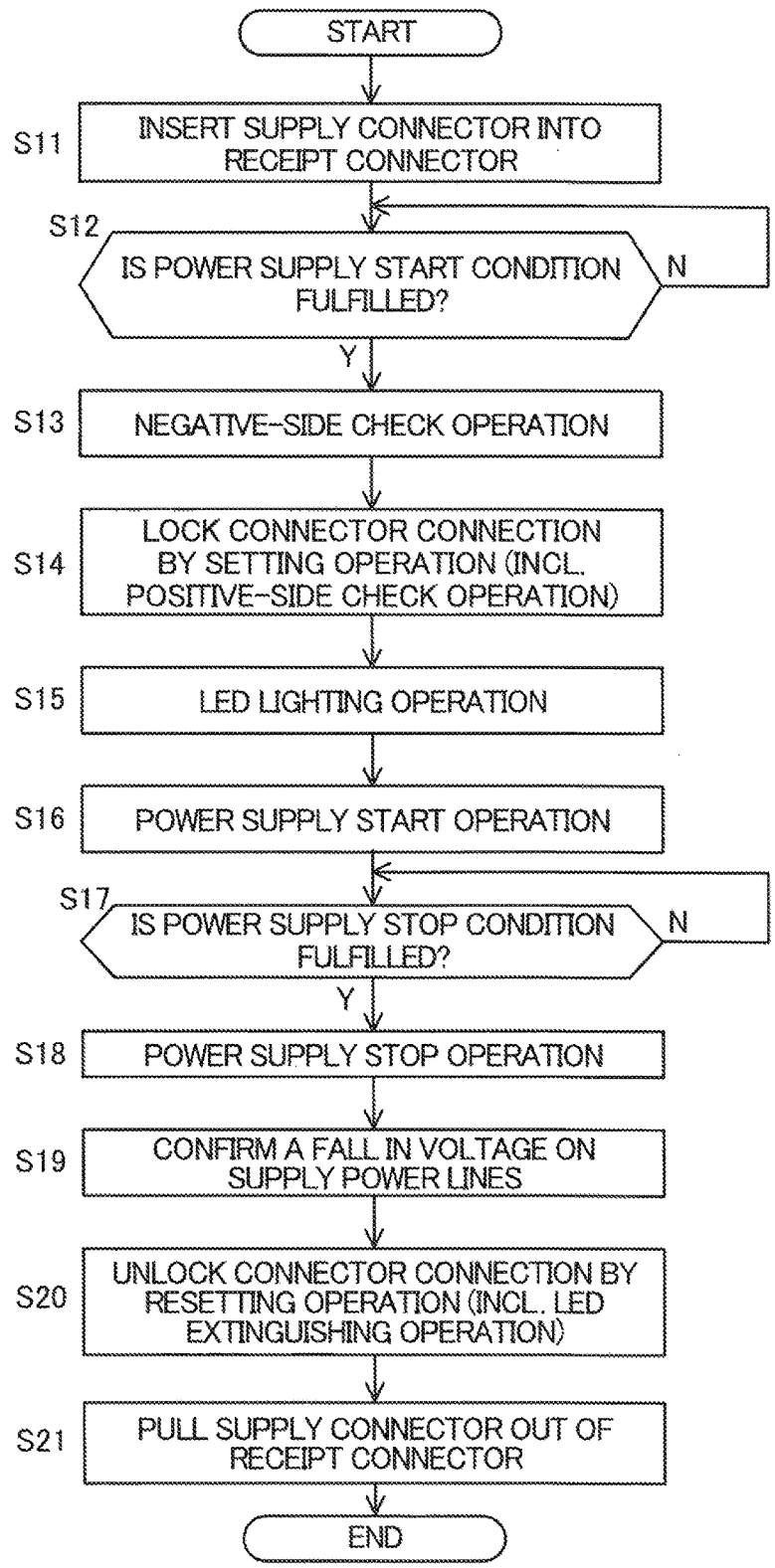
FIG. 7 is a flow chart of power supply operation between a PCS and an electric vehicle according to the first embodiment of the present invention.

Next, with reference to FIG. 7, the flow of power supply operation between the PCS 10 and the electric vehicle 20 will be described. FIG. 7 is a flow chart of the power supply operation. Starting with the connector-disconnected state, at Step S11, the operator inserts the supply connector 11 into the receipt connector 21, and thereby connects together the connectors 11 and 21. With the connectors 11 and 21 connected together, at Step S12, the processor 124 checks whether or not a power supply start condition is fulfilled, and if the power supply start condition is fulfilled, an advance is made to Step S13. Through steps S11 and S12, the output relay 114 remains off.

The power supply start condition is fulfilled, for example, when the operator gives the PCS 10 a predetermined power supply start instruction. The power supply start instruction can be a press on the START button 17a (see FIG. 1) on the operation panel 17. The power supply start condition can also be fulfilled, for example, when the PCS 10 receives a power supply start instruction from a host (upper-hierarchy) controller (unillustrated) which controls the PCS 10. When the power supply start condition is fulfilled, the PCS controller 14 and the vehicle controller 23 share relevant information respectively stored in them across the communication line inside the harness 12 by communication complying with a communication standard such as CAN (controller area network).

At Step S13, the processor 124 performs the negative-side check operation described above to check whether or not there is an abnormality in the circuitry for resetting the latching solenoid 33. If no harness/circuit abnormality is found in the negative-side check operation, an advance is made to Step S14; however, if a harness/circuit abnormality is found, no advance is made to Step S14 but an aborting operation is performed. In the aborting operation, the PCS controller 14 displays on the display screen 15 and/or sounds from the loudspeaker 16 a message like "an abnormality is found in the charging system; call a serviceperson."

At Step S14, the processor 124 performs the setting operation described above (the predetermined period $T_{SET}$ mentioned above is sufficient to execute the setting operation). This sets the latching solenoid 33, and brings the connector connection into the locked state. Specifically, at Step S14, the processor 124 controls the relays 113, 114, and 117 such that the positive DC voltage Va (i.e., set voltage) is applied to the terminal 142a relative to the terminal 142b of the operating coil 142 for the predetermined period $T_{SET}$ or more. In the setting operation at Step S14, the positive-side check operation is performed as well. Specifically, in the setting operation at Step S14, the relays 113, 114, and 117 are so controlled that the voltage Va is applied to the terminal 114a, that the output relay 114 is on, and that the polarity reversal relay 117 is in the positive-polarity state, and this control corresponds to the positive-side check control $J_{A1}$ described previously. Thus, based on the current check signal and the positive- and negative-side check signals during this control, whether or not the check condition $C_{A1}$ is fulfilled can be checked, and thereby whether or not there is a harness/circuit abnormality can be checked. Here, if no harness/circuit abnormality is found, an advance is made to Step S15; if a harness/circuit abnormality is found, no advance is made to Step S15 but an aborting operation is performed.

At Step S15, the processor 124 performs an LED lighting operation, and then an advance is made to Step S16. Through the LED lighting operation, the terminal 113b is connected to the terminal 113c, the output relay 114 is turned on, and the polarity reversal relay 117 is brought into the positive-polarity state. Thus, the LED 144 is lighted based on the voltage Vb. The lighting of the LED 144 resulting from the LED lighting operation continues until an LED extinguishing operation, which will be described later, is performed. In this embodiment, it is assumed that the voltage for lighting the LED 144 can be lower than the set voltage (i.e., Va) for the operating coil 142, and accordingly, in the LED lighting operation, the terminal 113b is connected to the terminal 113c. Instead, in the LED lighting operation, the terminal 113a may be connected to the terminal 113c so that the LED 144 is supplied with the voltage Va.

At Step S16, the processor 124 (PCS controller 14) performs a power supply start operation. Before the execution of the power supply start operation, the charger 13 does not output the supply voltage to the supply power lines 12P. In the power supply start operation, the processor 124 (PCS controller 14) controls the charger 13 so that the supply voltage starts to be output to the supply power lines 12P, and thus the battery 22 starts to be charged based on the supply voltage. After the execution of the power supply start operation, an advance is made to Step S17.

At Step S17, whether or not a power supply stop condition is fulfilled is checked, and if it is fulfilled, an advance is made to Step S18. For example, the power supply stop condition is fulfilled when the operator gives the PCS 10 a predetermined power supply stop instruction. The power supply stop instruction can be, for example, a press on the STOP button 17b (see FIG. 1) on the operation panel 17. The power supply stop condition can also be fulfilled, for example, when the PCS 10 receives a power supply stop instruction from a host (upper-hierarchy) controller (unillustrated) which controls the PCS 10. For another example, when the vehicle controller 23 finds the battery 22 fully charged, a full charge signal indicating the state is transferred from the vehicle controller 23 to the PCS controller 14, and the occurrence of this transfer may be taken as the fulfillment of the power supply stop condition.

At Step S18, the processor 124 (PCS controller 14) performs a power supply stop operation, and then an advance is made to Step S19. Through the power supply stop operation, the output of the supply voltage to the supply power lines 12P by the charger 13 is stopped.

At Step S19, the processor 124 (PCS controller 14) checks whether or not the voltage applied between the pair of supply power lines 12P is equal to or lower than a predetermined value, by use of a voltage detector (unillustrated) provided for the detection of that voltage. After the voltage applied between the pair of supply power lines 12P is found to be equal to or lower than the predetermined value, an advance is made to Step S20. If, at Step S19, the voltage applied between the supply power lines 12P does not fall to or below the predetermined value within a predetermined period, an aborting operation is performed.

At Step S20, the processor 124 performs the resetting operation described above (the predetermined period $T_{RESET}$ mentioned above is sufficient to execute the resetting operation). This resets the latching solenoid 33, bringing the connector connection into the unlocked state. At Step S20, an LED extinguishing operation is performed as well. Through the LED extinguishing operation, the positive voltage Vb ceases to be applied to the line 101 relative to the line 102, and thus the LED 144 is extinguished. In practice, in the resetting operation, first the negative voltage Vb is applied to the line 101 relative to the line 102 for the predetermined period $T_{RESET}$, and then the output relay 114 is turned off. Thus, the LED extinguishing operation can be considered to be performed concurrently with the resetting operation.

The lighted LED 144 serves to indicate to the operator that the connector connection is in the locked state, and that the operator should not touch the supply connector 11 (i.e., the operator is prohibited from connecting together the connectors 11 and 21 or disconnecting them from each other). The extinguished LED 144 serves to indicate to the operator that the connector connection is in the unlocked state, and that the operator can touch the supply connector 11 (i.e., the operator is permitted to connect together the connectors 11 and 21 or disconnect them from each other). Thus, noticing the LED 144 go out at Step S21, the operator realizes that he can now pull the supply connector 11 out of the receipt connector 21, and acts accordingly.

Incidentally, when an abnormality is found in the negative-side check operation, then in the resetting operation to be executed after the setting operation, it may occur that the connector connection cannot be brought into the unlocked state. If this is the case, the setting operation should not be performed. Accordingly, in the flow chart in FIG. 7, the negative-side check operation (Step S13) is performed before the execution of the setting operation at Step S14. However, the negative-side check operation may be performed after the setting operation.

In the first embodiment, the following premises (Premises 1 to 3) are fulfilled:

Premise 1—After the setting operation, the operator cannot pull the supply connector 11 out of the receipt connector 21 unless permitted by the PCS 10.

Premise 2—After the setting operation, the operator can pull the supply connector 11 out of the receipt connector 21 if permitted by the PCS 10.

Premise 3—The supply connector 11 is provided with the indicator 41 for indicating whether the connector connection is in the locked or unlocked state.

When the voltage on the supply power lines 12P has fallen to be sufficiently low to ensure safety (Step S19), the PCS 10 gives a permission (Step S20). Accordingly, in this embodiment, where Premises 1 and 2 are fulfilled, the operator's safety is ensured. Moreover, providing the voltage detectors 120 and 121 and the current detector 123 makes it possible to detect whether or not there is a harness/circuit abnormality, and this ensures that Premises 1 and 2 are fulfilled. Furthermore, owing to Premise 3 being fulfilled, the supply connector 11, which the operator actually sees and touches, is provided with the indicator 41 (corresponding to the LED 144); the operator can thus easily and reliably recognize whether the connector connection is in the locked or unlocked state (whether or not he can pull the supply connector 11 out).

When a two-line latching solenoid is used, setting and resetting it require a positive and a negative voltage. However, using the polarity reversal relay 117 helps simplify the configuration. If the detection resistor 123a is arranged on the output side of the polarity reversal relay 117, that is, in the conductor 118 or 119, then depending on the combination of the contacts of the polarity reversal relay 117, the potential at the detection resistor 123a is offset by Va or Vb in the positive or negative direction relative to the ground potential. Such offsets complicate the design of the circuit (such as an amplifier) for detecting the voltage across the detection resistor 123a. The configuration shown in FIG. 6 is free from that inconvenience: the combination of the detection resistor 123a provided on the input side of the polarity reversal relay 117 with the voltage detectors 120 and 121 detecting the polarity of the voltage on the output side of the polarity reversal relay 117 allows a comparatively inexpensive configuration that enables the processor 124 to grasp the value and direction of the current. When a broken conductor in the harness 12 or a fused contact in a relay causes a value or direction of the current that does not match the processor 124's control, it can be recognized that there is a harness/circuit abnormality.

When a non-latching solenoid is used as in Patent Document 1, keeping the connector connection in the locked state requires that the operating coil be kept supplied with electric power. In this embodiment, owing to the use of a latching solenoid, which requires electric power only when its state is switched between a set and a reset state, the solenoid consumes less electric power and produces less heat than when a non-latching solenoid is used. This can lead to a comparable increase in the amount of electric power transferred across the supply power lines 12P, and can contribute to a reduction in connector size (the same applies to the second embodiment described later). Moreover, when a non-latching solenoid is used, even while the supply voltage is being output, it may occur that the solenoid ceases to receive electric power due to a failure and its locked state is released. When a latching solenoid is used, its locked state is not released unless the reset voltage is applied intentionally; thus, the locked state is less likely to be released even while the supply voltage is being supplied (the same applies to the second embodiment described later).

Another conceivable approach, Reference Approach A, to fulfilling Premises 1 to 3 is as follows. In Reference Approach A, a microcomputer is provided within the supply connector, and serial communication is conducted between the PCS and the supply connector. In Reference Approach A, in response to an instruction from the PCS, the microcomputer within the supply connector lights and extinguishes the indicator on the supply connector, and locks and unlocks the latch solenoid. Inconveniently, attempting to fulfill Premises 1 to 3 by Reference Approach A suffers from the following problems (Problems $P_{A1}$ to $P_{A5}$).

Problem $P_{A1}$—At least two lines are needed as lighting power lines for the indicator and lines for passing a current through the operating coil of the latch solenoid, and in addition at least two lines are needed for serial communication: thus, when a two-line latch solenoid is used, at least four lines are needed to connect between the PCS and the supply connector (excluding the line for passing the charge current for the battery 22 and the communication line between the PCS and the electric vehicle).

Problem $P_{A2}$—Serial communication is susceptible to noise.

Problem $P_{A3}$—Providing a microcomputer in the supply connector is prone to result in lower reliability.

Problem $P_{A4}$—The design requiring coordination between the PCS and the electronic circuit within the supply connector including the microcomputer to fulfill Premises 1 to 3 makes the supply connector significantly less universal.

Problem $P_{A5}$—Unavailability of a function for direct detection of the value of the current through the operating coil inside the supply connector results in incapability of detecting an abnormality due to a broken conductor or the like.

With this embodiment, with respect to Problem $P_{A1}$, the PCS and the supply connector can be connected together by as few as two lines (101 and 102) (except the line for passing a charge current through the battery 22 and the communication line between the PCS and the electric vehicle), and this helps reduce the number of conductors. Problems $P_{A2}$ to $P_{A5}$ are either solved or alleviated.

Second Embodiment

A PCS 10 according to a second embodiment of the present invention will be described. The second embodiment, and also the third embodiment described later, is an embodiment based on the first embodiment. Accordingly, as to any features of the second and third embodiments that are not specifically described, the relevant parts of the description of the first embodiment apply unless inconsistent.

Figure 8:
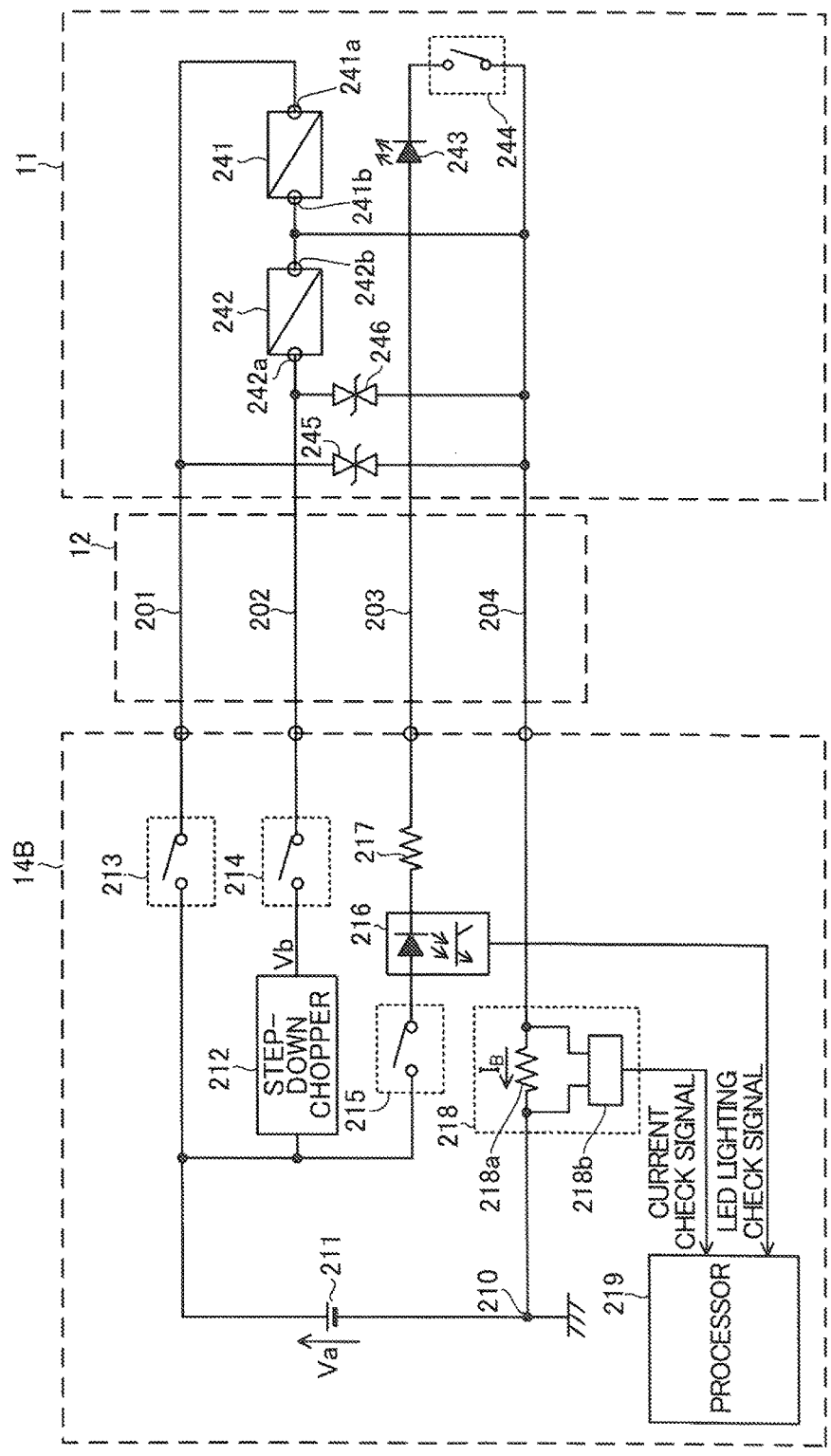
FIG. 8 is a diagram showing a part of the circuit of a PCS and the circuit inside a supply connector according to a second embodiment of the present invention.

FIG. 8 is a diagram showing the circuit of a part of the PCS 10 and the circuit inside the supply connector 11 according to the second embodiment. In the second embodiment, the PCS controller 14 has a circuit block 14B. The circuit block 14B includes components identified by the reference signs 210 to 219. The supply connector 11 includes components identified by the reference signs 241 to 246. The harness 12 includes, in addition to the supply power lines 12P and the communication line mentioned previously, lines 201 to 204.

A voltage source 211 outputs a predetermined positive DC (direct-current) voltage Va. A step-down chopper 212 steps down the output DC voltage of the voltage source 211 to output a positive DC voltage Vb lower than the DC voltage Va. As in the first embodiment, when the DC voltage Vb is unnecessary, the processor 219 can stop the operation of the step-down chopper 212. The voltages Va and Vb are voltages relative to a ground potential at a reference potential point 210. Accordingly, the negative-side output terminal of the voltage source 211 is connected to the reference potential point 210, and the DC voltage Va, which is positive relative to the ground potential at the reference potential point 210, is output from the positive-side output terminal of the voltage source 211.

A set relay 213 is a relay that, under the control of the processor 219, turns on and off the application of the output voltage Va of the voltage source 211 to the line 201. When the set relay 213 is on, the voltage source 211 is connected to the line 201, so that the output voltage Va of the voltage source 211 is applied to the line 201; when the set relay 213 is off, the path between the voltage source 211 and the line 201 is cut off, so that the output voltage Va of the voltage source 211 is not applied to the line 201.

A reset relay 214 is a relay that, under the control of the processor 219, turns on and off the application of the output voltage Vb of the step-down chopper 212 to the line 202. When the reset relay 214 is on, the step-down chopper 212 is connected to the line 202, so that the output voltage Vb of the step-down chopper 212 is applied to the line 202; when the reset relay 214 is off, the path between the step-down chopper 212 and the line 202 is cut off, so that the output voltage Vb of the step-down chopper 212 is not applied to the line 202.

An LED relay 215 turns on and off under the control of the processor 219. One end of the LED relay 215 is connected to a branch conductor that branches off the conductor across which the positive-side output terminal of the voltage source 211 is connected to the set relay 213. The other end of the LED relay 215 is connected to a light-emitting element inside a photocoupler 216. When the LED relay 215 is on, the path between one and the other ends of the LED relay 215 is in a conducting state. Accordingly, when the LED relay 215 is on, the positive-side output terminal of the voltage source 211 is connected, via the light-emitting element inside the photocoupler 216 and a resistor 217, to the line 203, and thus a voltage based on the output voltage Va of the voltage source 211 is applied to the line 203. When the LED relay 215 is off, the path between the voltage source 211 and the line 203 is cut off, and thus the voltage based on the output voltage Va of the voltage source 211 is not applied to the line 203.

The photocoupler 216 detects whether or not a current is passing through an LED 243. The resistor 217 is for letting an adequate current pass through the LED 243 when it is lighted. When the LED relay 215 is on and in addition a microswitch 244, which will be described later, is also on, a current based on the output voltage Va of the voltage source 211 passes, via the light-emitting element in the photocoupler 216, the resistor 217, and the line 203, through the LED 243, which thus emits light; this causes a light-receiving element in the photocoupler 216 to output an LED lighting check signal having logic level "1." When at least one of the LED relay 215 and the microswitch 244 is off, no current passes through the LED 243 (which thus does not emit light); this causes the light-receiving element in the photocoupler 216 to output an LED lighting check signal having logic level "0."

A current detector 218 detects the value $I_B$ of the current passing through the line 204, and outputs a current check signal reflecting the result of the detection to the processor 219. The current detector 218 has a detection resistor 218a and a block 218b for generating a current check signal reflecting the voltage occurring across the detection resistor 218a (e.g., an amplifier for amplifying the voltage occurring across the detection resistor 218a). The line 204 is connected via a conductor within the circuit block 14B to the reference potential point 210, and the detection resistor 218a is serially inserted in that conductor.

The processor 219 comprises a CPU (central processing unit) or the like. While referring to the current check signal, the LED lighting check signal, etc., the processor 219 can control the on/off states of the relays 213 to 215 and also control the operation of the step-down chopper 212. In the following description, unless otherwise stated, it is assumed that the step-down chopper 212 is constantly outputting the voltage Vb.

The second embodiment assumes the use of a three-line latching solenoid 33, and the operating coil inside the latching solenoid 33 has a set coil 241 for setting the latching solenoid 33 and a reset coil 242 for resetting the latching solenoid 33. One terminal 241a of the set coil 241 is connected to the line 201, and the other terminal 241b of the set coil 241 is connected to the line 204. One terminal 242a of the reset coil 242 is connected to the line 202, and the other terminal 242b of the reset coil 242 is connected to the line 204.

When the set relay 213 is on, the voltage Va is applied between the lines 201 and 204, and a current passes through the set coil 241 from the terminal 241a to the terminal 241b. The latching solenoid 33 is thus set, with a result that the connector connection is in the locked state. Thus, the voltage Va applied to the line 201 corresponds to the set voltage described previously.

On the other hand, when the reset relay 214 is on, the voltage Vb is applied between the lines 202 and 204, and a current passes through the reset coil 242 from the terminal 242a to the terminal 242b. The latching solenoid 33 is thus reset, with a result that the connector connection is in the unlocked state. Thus, the voltage Vb applied to the line 202 corresponds to the reset voltage described previously.

The LED 243 corresponds to the indicator 41 shown in FIGS. 3 to 5, and the microswitch 244 corresponds to the microswitch 32 shown in FIGS. 3 to 5. The anode of the LED 243 is connected to the line 203, and the cathode of the LED 243 is connected to one end of the microswitch 244. The other end of the microswitch 244 is connected to the line 204. The microswitch 244, which corresponds to the microswitch 32 in FIG. 3 etc., is on in the connector-connected state. Only when the microswitch 244 is on, is the cathode of the LED 243 connected to the line 204, permitting the LED 243 to emit light.

A surge protection element 245 is connected between the lines 201 and 204 to clamp the voltage there for protection against a surge voltage (e.g., a surge voltage occurring in the set coil 241) that can appear there, in order to suppress failure of the components inside the supply connector 11. A surge protection element 246 is connected between the lines 202 and 204 to clamp the voltage there for protection against a surge voltage (e.g., a surge voltage occurring in the reset coil 242) that can appear there, in order to suppress failure of the components inside the supply connector 11.

As will be understood from the above description, the DC voltage Va is a voltage for setting the latching solenoid 33, and the DC voltage Vb is a voltage for resetting the latching solenoid 33. The DC voltage Va also serves as a voltage for lighting the LED 243. The set relay 213 switches between whether or not to apply the voltage Va to the set coil 241. The reset relay 214 switches between whether or not to apply the voltage Vb to the reset coil 242. The LED relay 215 switches between whether or not to supply the voltage Va to the LED 243.

Figure 9:
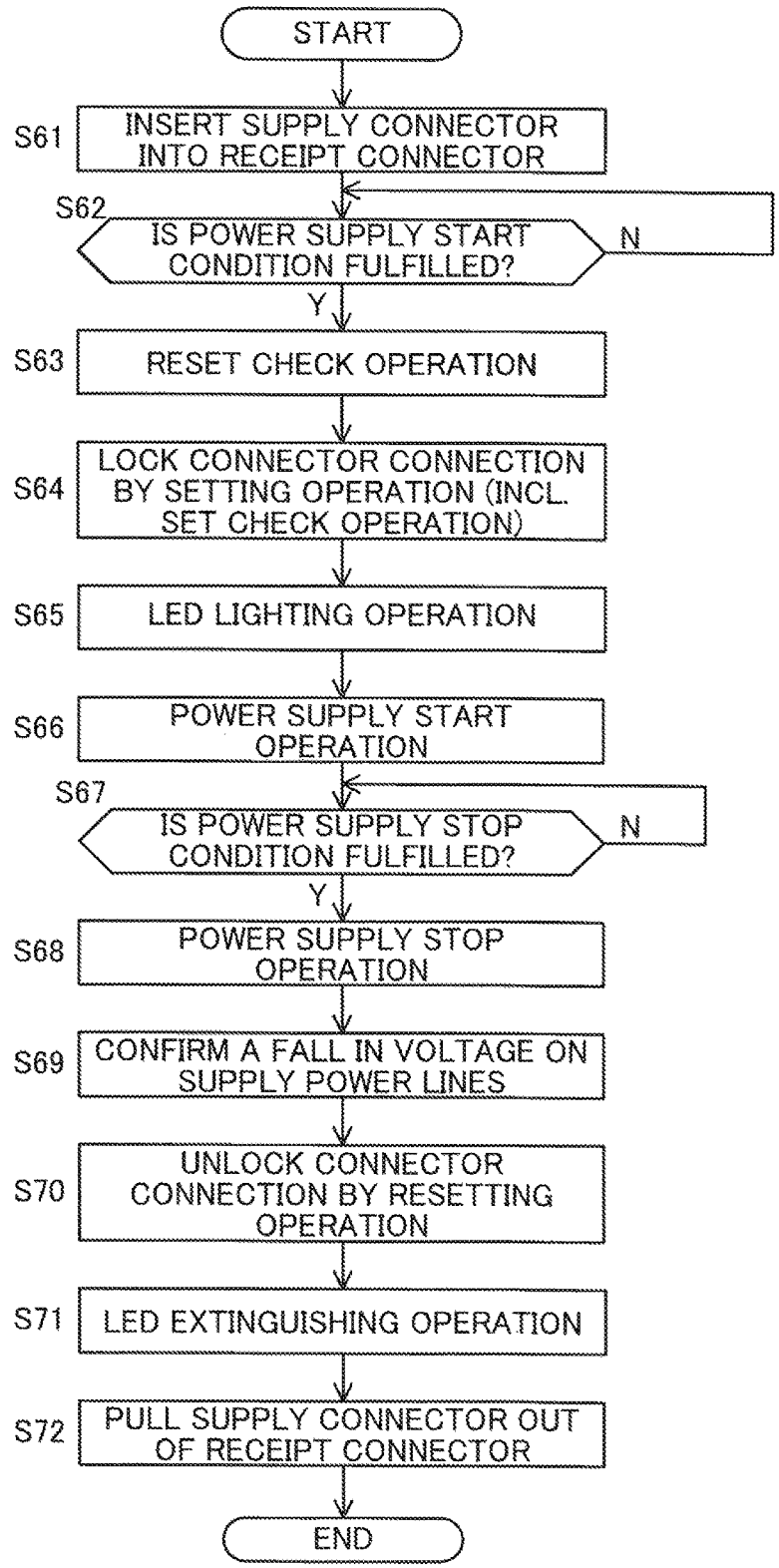
FIG. 9 is a flow chart of power supply operation between a PCS and an electric vehicle according to the second embodiment of the present invention.

Next, with reference to FIG. 9, the flow of power supply operation between the PCS 10 and the electric vehicle 20 will be described. FIG. 9 is a flow chart of the power supply operation. Starting with the connector-disconnected state, at Step S61, the operator inserts the supply connector 11 into the receipt connector 21 and thereby connects together the connectors 11 and 21. With the connectors 11 and 21 connected together, at Step S62, the processor 219 checks whether or not a power supply start condition is fulfilled, and if the power supply start condition is fulfilled, an advance is made to Step S63. Through steps S61 and S62, the relays 213 to 215 all remain off. The power supply start condition and the check of whether or not it is fulfilled are as described previously in connection with the first embodiment.

At Step S63, the processor 219 performs a reset check operation. In the reset check operation, the processor 219 controls the relays 213 and 214 such that the set relay 213 is off and the reset relay 214 is on (in the following description, this control is referred to as the reset check control $J_{B1}$).

While the reset check control $J_{B1}$ is being performed, unless there is a harness/circuit abnormality, a predetermined check condition $C_{B1}$ is fulfilled. The check condition $C_{B1}$ is fulfilled when the current value $I_B$ indicated by the current check signal falls within a predetermined range $R_{B1}$, and is not fulfilled otherwise. When the check condition $C_{B1}$ is not fulfilled, despite the reset check control $J_{B1}$, no proper current is passing through the operating coil (241 and 242). Thus, in the reset check operation, based on the current check signal as it is while the reset check control $J_{B1}$ is being performed, the processor 219 checks whether or not the check condition $C_{B1}$ is fulfilled so as to judge that, if the check condition $C_{B1}$ is fulfilled, there is no harness/circuit abnormality and, if the check condition $C_{B1}$ not fulfilled, there is a harness/circuit abnormality. Through the reset check operation, it is determined whether or not there is an abnormality in the circuitry for resetting the latching solenoid 33.

If, in the reset check operation, no harness/circuit abnormality is found, the processor 219 judges that the latching solenoid 33 can be reset properly, and an advance is made to Step S64. On the other hand, if a harness/circuit abnormality is found, the processor 219 judges that the latching solenoid 33 cannot be reset properly, and no advance is made to Step S64 but an aborting operation is performed. The aborting operation is as described previously in connection with the first embodiment.

At Step S64, the processor 219 performs a setting operation for setting the latching solenoid 33, and then an advance is made to Step S65. In the second embodiment, the setting operation is an operation in which, with the reset relay 214 off, the set relay 213 is held on for a predetermined period $T_{SET}$ or more. In practice, first the set relay 213 is held on for the predetermined period $T_{SET}$, and then the set relay 213 is turned off. Through the setting operation at Step S64, the connector connection is brought into the locked state. After the setting operation, unless a resetting operation is performed, the connector connection is kept in the locked state and the latching solenoid 33 is kept in the set state (i.e., the locked state and the set state are latched).

At Step S64, a set check operation is performed as well. In the set check operation, the processor 219 controls the relays 213 and 214 such that the set relay 213 is on and the reset relay 214 is off (in the following description, this control is referred to as the set check control $J_{B2}$). Also in the setting operation, control similar to the set check control $J_{B2}$ is performed; thus, it is possible to perform the set check operation in the setting operation.

While the set check control $J_{B2}$ is being performed, if there is no harness/circuit abnormality, a predetermined check condition $C_{B2}$ is fulfilled. The check condition $C_{B2}$ is fulfilled when the current value $I_B$ indicated by the current check signal falls within a predetermined range $R_{B2}$, and is not fulfilled otherwise. When the check condition $C_{B2}$ is not fulfilled, despite the set check control $J_{B2}$, no proper current is passing through the operating coil (241 and 242). Thus, in the set check operation, based on the current check signal as it is while the set check control $J_{B2}$ is being performed, the processor 219 checks whether or not the check condition $C_{B2}$ is fulfilled so as to judge, if the check condition $C_{B2}$ is fulfilled, there is no harness/circuit abnormality and, if the check condition $C_{B2}$ is not fulfilled, there is a harness/circuit abnormality. Through the set check operation, it is determined whether or not there is an abnormality in the circuitry for setting the latching solenoid 33.

If, in the set check operation, no harness/circuit abnormality is found, the processor 219 judges that the latching solenoid 33 is properly set, and permits an advance to Step S65. On the other hand, if a harness/circuit abnormality is found, the processor 219 judges that the latching solenoid 33 is not properly set, no advance is made to Step S65 but an aborting operation is performed.

As described above, in the set check operation and the reset check operation, the processor 219 cooperates with the current detector 218 to detect what current is passing through the operating coil (241 and 242), and based on the result of the detection, detects whether or not there is a harness/circuit abnormality. According to a specific method, referring to how the processor 219 itself is controlling the relays 213 to 215, the processor 219 detects whether or not there is a harness/circuit abnormality based on the value $I_B$ of the current passing through the line 204.

A harness/circuit abnormality can be an abnormality in the harness 12, an abnormality in the control circuit of the PCS 10, and an abnormality in the circuit inside the supply connector 11.

An abnormality in the harness 12 can be a broken conductor or a short circuit in the harness 12 (lines 201 to 204).

The control circuit of the PCS 10 includes the circuit block 14B. For example, an abnormality in which, although the processor 219 so controls as to turn on the set relay 213, the set relay 213 does not turn on is classified as an abnormality in the control circuit of the PCS 10. For another example, an abnormality in which, although the processor 219 so controls as to turn on the set relay 213 alone, due to a fused contact in the reset relay 214, the relays 213 and 214 both turn on is also classified as an abnormality in the control circuit of the PCS 10. In this case, the current value $I_B$ exceeds the upper limits of the predetermined ranges $R_{B1}$ and $R_{B2}$ respectively. For yet another example, an abnormality in the output of the voltage source 211 is also classified as an abnormality in the control circuit of the PCS 10.

The circuit inside the supply connector 11 includes the components identified by the reference signs 241 to 246. For example, a broken conductor in the set coil 241 or the reset coil 242 is classified as an abnormality in the circuit inside the supply connector 11.

At Step S65, the processor 219 performs an LED lighting operation, and then an advance is made to Step S66. In the LED lighting operation, the LED relay 215 is turned on (until Step S65 is reached, the LED relay 215 is kept off). The LED relay 215 is kept in the on state until an LED extinguishing operation is performed at Step S71, which sill be described later. Thus, through steps S65 to S71, the LED 243 remains lighted. After the LED relay 215 is turned on, before an advance to Step S66 is made, the processor 219 may check the LED lighting check signal so that, when the logic level of the LED lighting check signal is "0," no advance is made to Step S66 but an aborting operation is performed. After the LED relay 215 is turned on, before an advance is made to Step S66, the processor 219 may check the current value $I_B$ indicating the value of the current passing through the LED 243 so that, if the current value $I_B$ is outside a predetermined range, no advance is made to Step S66 but an aborting operation is performed.

At Step S66, the processor 219 (PCS controller 14) performs a power supply start operation. Before the execution of the power supply start operation, the charger 13 does not output the supply voltage to the supply power lines 12P. In the power supply start operation, the processor 219 (PCS controller 14) controls the charger 13 to start to output the supply voltage to the supply power lines 12P, and the battery 22 starts to be charged based on the supply voltage. After the execution of the power supply start operation, an advance is made to Step S67.

At Step S67, whether or not a power supply stop condition is fulfilled is checked, and if the power supply stop condition is fulfilled, an advance is made to Step S68. The power supply stop condition and the check of whether or not it is fulfilled are as described previously in connection with the first embodiment.

At Step S68, the processor 219 (PCS controller 14) performs a power supply stop operation, and then an advance is made to Step S69. Through the power supply stop operation, the output of the supply voltage to the supply power lines 12P by the charger 13 is stopped.

At Step S69, the processor 219 (PCS controller 14) checks whether or not the voltage applied to the pair of supply power lines 12P is equal to or lower than a predetermined value by use of a voltage detector (unillustrated) for detecting that voltage. After the voltage applied to the pair of supply power lines 12P is found to be equal to or lower than the predetermined value, an advance is made to Step S70. If, at Step S69, the voltage applied to the supply power lines 12P does not fall to or below the predetermined value after the lapse of a predetermined period, an aborting operation is performed.

At Step S70, the processor 219 performs a resetting operation for resetting the latching solenoid 33, and then an advance is made to Step S71. In the second embodiment, the resetting operation is an operation in which, with the set relay 213 off, the reset relay 214 is held on for a predetermined period $T_{RESET}$ or more. In practice, first the reset relay 214 is held on for the predetermined period $T_{RESET}$, and then the reset relay 214 is turned off. Through the resetting operation at Step S70, the connector connection is brought into the unlocked state. After the resetting operation, unless a setting operation is performed, the connector connection is kept in the unlocked state and the latching solenoid 33 is kept in the reset state (i.e., the unlocked state and the reset state are latched).

At Step S71, the processor 219 performs an LED extinguishing operation to turn off the LED relay 215. Thus, the LED 243 is extinguished.

The lighted LED 243 serves to indicate to the operator that the connector connection is in the locked state, and that the operator should not touch the supply connector 11 (i.e., the operator is prohibited from connecting together the connectors 11 and 21 or disconnecting them from each other). The extinguished LED 243 serves to indicate to the operator that the connector connection is in the unlocked state, and that the operator can touch the supply connector 11 (i.e., the operator is permitted to connect together the connectors 11 and 21 or disconnect them from each other). Thus, noticing the LED 243 go out at Step S72 subsequent to Step S71, the operator realizes that he can now pull the supply connector 11 out of the receipt connector 21, and acts accordingly.

Incidentally, when an abnormality is found in the reset check operation, then in the resetting operation to be executed after the setting operation, it may occur that the connector connection cannot be brought into the unlocked state. If this is the case, the setting operation should not be performed. Accordingly, in the flow chart in FIG. 9, the reset check operation (Step S63) is performed before the execution of the setting operation at Step S64. However, the reset check operation may be performed after the setting operation.

In the second embodiment, as in the first embodiment, Premises 1 to 3 noted previously are satisfied so that, when the voltage on the supply power lines 12P has fallen to be sufficiently low to ensure safety (Step S69), the PCS 10 gives a permission (Step S70). Accordingly, in this embodiment, where Premises 1 and 2 are fulfilled, the operator's safety is ensured. Moreover, providing the current detector 218 makes it possible to detect whether or not there is a harness/circuit abnormality, and this ensures that Premises 1 and 2 are fulfilled. Furthermore, owing to Premise 3 being fulfilled, the supply connector 11, which the operator actually sees and touches, is provided with the indicator 41 (corresponding to the LED 243); the operator can thus easily and reliably recognize whether the connector connection is in the locked or unlocked state (whether or not he can pull the supply connector 11 out).

Another conceivable approach, Reference Approach B, to fulfilling Premises 1 to 3 is as follows. In Reference Approach B, a microcomputer is provided within the supply connector, and serial communication is conducted between the PCS and the supply connector. In Reference Approach B, in response to an instruction from the PCS, the microcomputer within the supply connector lights and extinguishes the indicator on the supply connector, and locks and unlocks the latch solenoid. Inconveniently, attempting to fulfill Premises 1 to 3 by Reference Approach B suffers from the following problems (Problems $P_{B1}$ to $P_{B5}$).

Problem $P_{B1}$—When a three-line latching solenoid is used, at least three lines are needed as lighting power lines for the indicator and lines for passing a current through the operating coil of the latching solenoid, and in addition at least two lines are needed for serial communication: thus, at least five lines are needed to connect between the PCS and the supply connector (excluding the line for passing the charge current for the battery 22 and the communication line between the PCS and the electric vehicle).

Problems $P_{B2}$ to $P_{B5}$ are similar to Problems $P_{AZ}$ to $P_{A5}$ mentioned previously in connection with the first embodiment.

With this embodiment, with respect to Problem $P_{B1}$, the PCS and the supply connector can be connected together by as few as four lines (201 to 204) (except the line for passing a charge current through the battery 22 and the communication line between the PCS and the electric vehicle), and this helps reduce the number of conductors. Problems $P_{B2}$ to $P_{B5}$ are either solved or alleviated.

Figure 10:
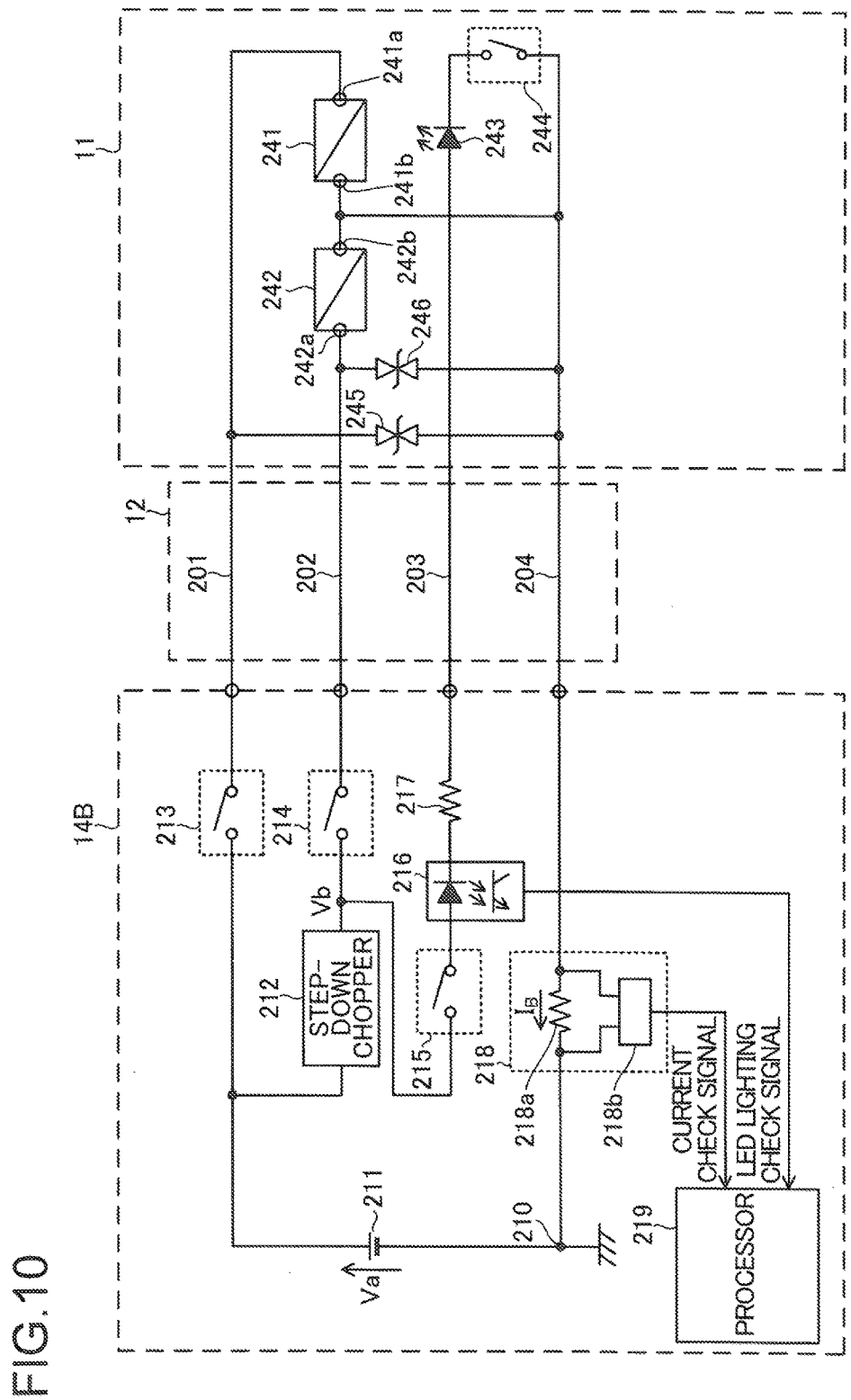
FIG. 10 is a circuit diagram showing a modified configuration of FIG. 8.

In the configuration shown in FIG. 8, the output of the voltage source 211 is connected to the LED relay 215; instead, as shown in FIG. 10, the output of the step-down chopper 212 may be connected to the LED relay 215. Specifically, it is possible to provide a branch conductor that branches off the conductor connecting the output terminal of the step-down chopper 212, to which the voltage Vb is applied, to one end of the reset relay 214 (with the other end of the reset relay 214 connected to the line 202), to connect the branch conductor to one end of the LED relay 215, and to connect the other end of the LED relay 215 to the light-emitting element inside the photocoupler 216. As described above, when the LED relay 215 is on, the path between one and the other ends of the LED relay 215 is in a conducting state. Accordingly, with the configuration shown in FIG. 10, when the LED relay 215 is on, the output terminal of the step-down chopper 212 is connected, via the light-emitting element inside the photocoupler 216 and the resistor 217, to the line 203, so that a voltage based on the output voltage Vb of the step-down chopper 212 is applied to the line 203. When the LED relay 215 is off, the path between the step-down chopper 212 and the line 203 is cut off, so that the voltage based on the output voltage Vb of the step-down chopper 212 is not applied to the line 203. With the configuration shown in FIG. 10, the LED 243 emits light based on the voltage Vb.

In the configuration of FIG. 6, 8, or 10, the voltage Vb is produced by use of a step-down chopper (112 or 212). This, however, is not meant to limit how to produce the voltage Vb; the voltage Vb may be produced through any power conversion based on the voltage Va. The voltage Vb may be produced based on a voltage other than the voltage Va. The absolute value of the voltage Vb can be equal to the absolute value of the voltage Va. In that case, the step-down chopper (112 or 212) is removed from the configuration of FIG. 6, 8, or 10, and the voltage Vb is interpreted as the same as the voltage Va (i.e., the voltages Va and Vb are interpreted as referring to a common, single DC voltage).

Third Embodiment

Figure 11:
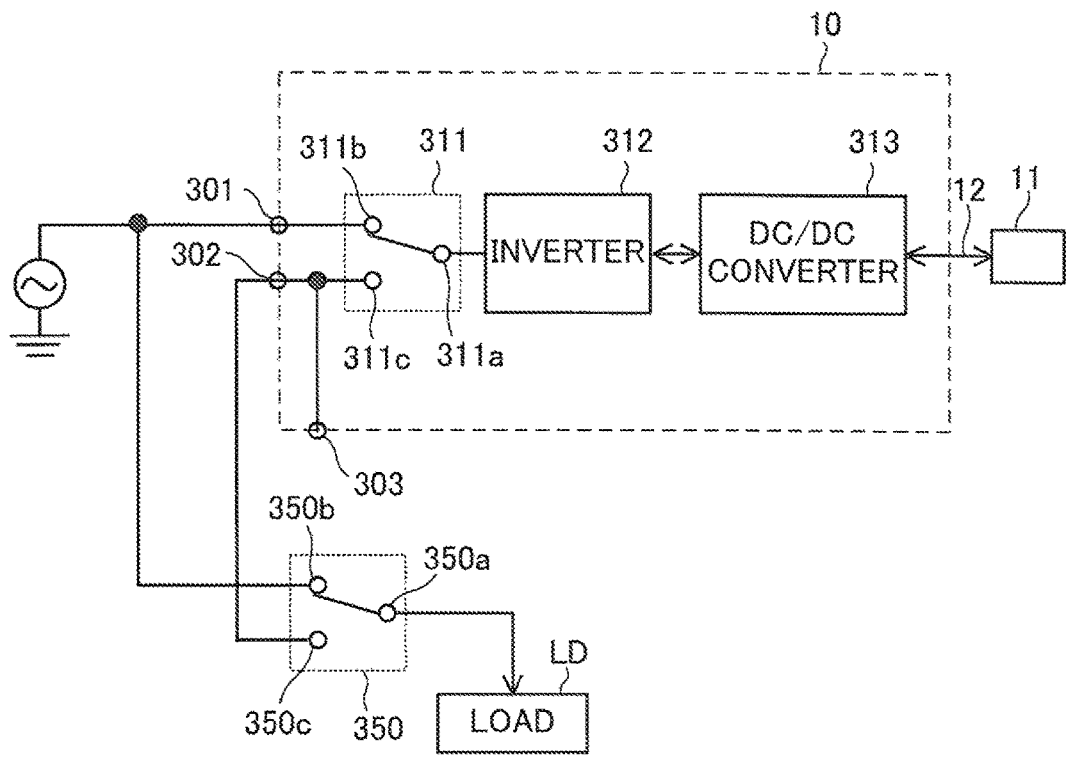
FIG. 11 is a schematic block diagram of a PCS according to a third embodiment of the present invention.

A PCS 10 according to a third embodiment of the present invention will be described. The PCS 10 may be furnished with, in addition to a first function of supplying electric power to (charging) the battery 22 of the electric vehicle 20, a second function of extracting electric power from the battery 22 of the electric vehicle 20 and supply the extracted electric power to another load. The third embodiment deals with an example of the PCS 10 that is implemented so as to realize the first and second functions. FIG. 11 is a schematic block diagram of a PCS 10 according to the third embodiment which realizes the first and second functions.

The PCS 10 shown in FIG. 11 includes terminals 301, 302, and 303, a switch 311 having terminals 311a, 311b, and 311c, a bidirectional inverter 312, and a bidirectional DC/DC converter 313. The PCS controller 14 (see FIG. 2) so switches that the terminal 311a is connected selectively to either the terminal 311b or the terminal 311c. The terminal 311a is connected to the inverter 312, the terminal 311b is connected to the terminal 301, and the terminal 311c is connected to the terminals 302 and 303.

Outside the PCS 10 is arranged a switch 350 having terminals 350a, 350b, and 350c. The switch 350 is installed in a house, factory, or the like. The terminal 350a is connected selectively to either the terminal 350b or 350c. The switches 311 and 350 are controlled such that, when the terminal 311a is connected to the terminal 311b, the terminal 350a is connected to the terminal 350b and, when the terminal 311a is connected to the terminal 311c, the terminal 350a is connected to the terminal 350c. The control of the switch 350 can be realized by the PCS controller 14 or another unillustrated controller. The switching between terminals at the switch 350 may be done manually. The terminal 350a is connected to a load LD, the terminal 350b is connected to the terminal 301, and the terminal 350c is connected to the terminal 302. The load LD can be any load in the house, factory, or the like, and can be connected to the terminal 350a via a power receptacle. An AC (alternating-current) voltage from a commercial AC power source (power system) is applied to the terminals 301 and 350b.

The operation mode of the PCS controller 14 (see FIG. 2) provided in the PCS 10 can be set for one of the following three modes: a first mode for realizing the first function; and a second and a third mode for realizing the second function.

In the first mode (i.e., when the operation mode of the PCS 10 is set for the first mode), the terminal 311a is connected to the terminal 311b. Thus, the switch 311 supplies the AC voltage from the commercial AC power source applied to the terminal 301 to the inverter 312, the inverter 312 converts the supplied AC voltage into a DC voltage and outputs the obtained DC voltage to the DC/DC converter 313, and the DC/DC converter 313 converts the DC voltage from the inverter 312 into a DC voltage with a desired voltage value and outputs the obtained DC voltage to the supply power lines 12P (see FIG. 2) in the harness 12. As a result, the battery 22 of the electric vehicle 20 is charged based on the output DC voltage of the DC/DC converter 313.

In the first mode, electric power is transferred from the PCS 10 to the battery 22 of the electric vehicle 20 via the connectors 11 and 21. Thus, as in the first and second embodiments, the connectors 11 and 21 serve as a supply connector and a receipt connector respectively. It can be considered that the inverter 312 and the DC/DC converter 313 in the first mode constitute the charger 13 in FIG. 2.

In the second or third mode (i.e., when the operation mode of the PCS 10 is set for the second or third mode), the PCS controller 14 (see FIG. 2), through communication with the vehicle controller 23 (see FIG. 1), demands the discharging of the battery 22 via the connector 21, and in response to this demand, the vehicle controller 23 lets the battery 22 discharge via the connector 21. In the second or third mode, the discharge electric power from the battery 22 is supplied, via the connector 21 of the electric vehicle 20, the connector 11 connected to the PCS 10, and the supply power lines 12P inside the harness 12, to the DC/DC converter 313. The DC/DC converter 313 then converts the discharge electric power from the battery 22 into a DC voltage having a desired voltage value and outputs the obtained DC voltage to the inverter 312. The inverter 312 then converts the output voltage of the converter 313 into an AC voltage and outputs the obtained AC voltage to the terminal 311a.

In the second mode, as in the first mode, the terminal 311a is connected to the terminal 311b. Accordingly, in the second mode, the output AC voltage from the inverter 312 is supplied to the terminal 301, but by an unillustrated reverse power flow prevention circuit, the output AC voltage from the inverter 312 is prevented from flowing in the reverse direction and is supplied via the terminals 301, 350b, and 350a to the load LD.

In the third mode, the terminal 311a is connected to the terminal 311c, and in a fashion coordinated with that, the terminal 350a is connected to the terminal 350c. Accordingly, in the third mode, the output AC voltage of the inverter 312 can be supplied via the terminals 302, 350c, and 350a to the load LD. Also, in the third mode, the output AC voltage of the inverter 312 appearing at the terminal 303 can be supplied to a desired load that is connected to the terminal 303 (a dedicated receptacle).

In the second or third mode, electric power is transferred from the battery 22 of the electric vehicle 20 to the PCS 10 via the connectors 11 and 21. Thus, the connectors 11 and 21 serve as a receipt connector and a supply connector respectively. A configuration is also possible where the output voltage of the DC/DC converter 313 in the second or third mode can be supplied to a desired load outside the PCS 10.

When the terminal 311a is connected to the terminal 311b and in addition the terminal 350a is connected to the terminal 350b, the commercial AC power source (power system) can supply electric power to the battery 22 of the electric vehicle 20 and to the load LD. Here, by making the PCS 10 operate in the second mode, it is possible to reduce the electric power supplied from the commercial AC power source to the load LD. For example, by charging the battery 22 with night-time electric power and supplying the discharge electric power of the battery 22 to the load LD during the day, it is possible to cut down the electricity bills of a household or the like that uses the load LD. It is also possible to reduce the peak of demand for the electric power received from the commercial AC power source (power system). The reduction of the peak also contributes to the reduction of electricity bills.

The third mode is useful in the event of, for example, a blackout.

Overview

To follow is an overview of the present invention. Embodiments of the present invention allow for many variations and modifications within the spirit and scope of the technical concepts recited in the appended claims. The embodiments described above merely present examples of how the present invention can be implemented, and the senses of the terms used to describe the present invention and its features are not limited to those in which the terms are used in the description of the embodiments. Any specific values mentioned in the above description are merely examples, and, needless to say, can be changed to many different values. In any flow charts referred to above, a plurality of operations performed in any sequence of a plurality of steps may be executed in any altered order, or concurrently, so long as no inconsistency arises among the operations involved.

The electric vehicle 20 is a kind of mobile body that can run by use of the output voltage of the battery 22. The electric vehicle 20 may run by use of the output voltage of the battery 22 in combination with fossil fuel. Mobile bodies to which the present invention is applicable are not limited to electric vehicles but encompass any mobile bodies that can move by use of the output voltage of the battery 22 (e.g., railway trains, ships, and robots).

Moreover, the present invention finds wide application in systems involving a first appliance and a second appliance, the latter exchanging electric power with the former. The PCS 10 corresponds to a first appliance, and a mobile body such as the electric vehicle 20 corresponds to a second appliance. The first and second appliances can both be mobile bodies like the electric vehicle 20. The second appliance can be an appliance that is not classified as a mobile body (like a stationary industrial machine).

According to a first configuration of the present invention, an electric power control device includes: a first connector (11) which is connected to a second connector (21) provided in a second appliance (20); and a control circuit (14, 14A, 14B) which is provided within a first appliance (10) that exchanges electric power with the second appliance via a harness (12), and which is connected to the first connector via the harness. Here, the first connector includes a latching solenoid (33) that switches connector connection, i.e., connection between the first and second connectors, between a locked state and an unlocked state. The control circuit outputs a predetermined first voltage (Va) to an operating coil (142, or 241 and 242) inside the latching solenoid to bring the connector connection into the locked state, and outputs a predetermined second voltage (Vb) to the operating coil to bring the connector connection into the unlocked state.

With this configuration, once the connector connection is brought into the locked state, unless the control circuit of the first appliance gives a permission (i.e., unless the control circuit confirms safety and brings the connector connection into the unlocked state), the operator cannot disconnect the first and second connectors from each other. This ensures safety of the operator.

A similar effect can be obtained by providing a microcomputer within the first connector and allowing serial communication between the first appliance and the first connector so that, in response to an instruction from the first appliance, the microcomputer within the first connector can switch the latching solenoid between the locked and unlocked states. However, this scheme requires an extra line for serial communication between the first appliance and the first connector, and accordingly complicates the configuration; it also suffers from lower reliability considering, among others, that serial communication is susceptible to noise and that the electronic circuit inside the first connector may malfunction. By contrast, according to the present invention, an electric power control device has a simple configuration, and offers high reliability.

When a non-latching solenoid is used as in Patent Document 1, electric power needs to be kept supplied to the operating coil to keep the connector connection in the locked state. When a latching solenoid is used, electric power needs to be supplied only when switching the state of the latch. This, as compared with using a non-latching solenoid, helps suppress electric power consumption and heat generation by the solenoid. When a non-latching solenoid is used, even while electric power is being transferred, it may occur that the solenoid ceases to receive a current due to a failure and the locked state is released. By contrast, when a latching solenoid is used, the unlocked state is not released unless the second voltage is supplied intentionally. Thus, there is relatively little likelihood of the locked state being released while electric power is being transferred (resulting in high reliability).

In the embodiments described above, an appliance that includes the PCS 10, the supply connector 11, and the harness 12 incorporates the electric power control device. In the embodiments described above, the control circuit of the electric power control device is a circuit that includes the control block 14A shown in FIG. 6 or the control block 14B shown in FIG. 8 or 10, and can also be considered to correspond to the PCS controller 14.

For example, according to a second configuration of the present invention, in the electric power control device according to the first configuration, preferably, the operating coil (142) is connected between first and second lines (101, 102) provided in the harness. When a positive voltage as the first voltage is applied to the first line relative to the second line, the connector connection is brought into the locked state, and when a negative voltage as the second voltage is applied to the first line relative to the second line, the connector connection is brought into the unlocked state. The control circuit (14A) has a voltage outputter (111, 112) that outputs one direct-current voltage (Va) or two direct-current voltages (Va, Vb), and the control circuit can output the one direct-current voltage or one of the two direct-current voltages to between the first and second lines while keeping the polarity of the voltage on the first line relative to the second line selectively either positive or negative.

Using a latching solenoid, which can be brought into the locked or unlocked state by application of a positive or negative voltage, requires output of a positive and a negative voltage. Adopting a scheme that outputs a voltage via polarity switching as described above helps simplify the configuration.

For another example, according to a third configuration of the present invention, in the electric power control device according to the second configuration, preferably, the first connector includes an indicator (41, 144) that indicates whether or not the connector connection is in the locked state, and the indicator is driven based on the voltage applied between the first and second lines.

Thus, the indicator is arranged on the first connector, which the operator can actually see and touch. The operator can thus easily and reliably recognize whether the connector connection is in the locked or unlocked state (whether or not he can pull the first connector out). Moreover, driving the indicator by exploiting the first and second lines, which are used to switch the connector connection between the locked and unlocked states, helps simplify the configuration.

For another example, according to a fourth configuration of the present invention, in the electric power control device according to the first configuration, preferably, the operating coil has a set coil (241) that brings the connector connection into the locked state in response to the first voltage (Va) being applied between a first line and a reference line (201, 204) inside the harness, and a reset coil (242) that brings the connector connection into the unlocked state in response to the second voltage (Vb) being applied between a second line and the reference line (202, 204) inside the harness.

This makes it possible to realize a configuration according to the present invention by use of a three-line latching solenoid.

For another example, according to a fifth configuration of the present invention, in the electric power control device according to the fourth configuration, preferably, the first connector includes an indicator (41, 243) that indicates whether or not the connector connection is in the locked state, and the control circuit (14B) drives the indicator by supplying the indicator with the first or second voltage via a third line (203) inside the connector.

Thus, the indicator is arranged on the first connector, which the operator can actually see and touch. The operator can thus easily and reliably recognize whether the connector connection is in the locked or unlocked state (whether or not he can pull the first connector out). Moreover, driving the indicator by exploiting the reference line, which is used to switch the connector connection between the locked and unlocked states, helps simplify the configuration.

For another example, according to a sixth configuration of the present invention, in the electric power control device according to the second or third configuration, preferably, the control circuit (14A) detects whether or not there is an abnormality in the harness, whether or not there is an abnormality in a circuit within the control circuit itself, or whether or not there is an abnormality in a circuit inside the first connector based on the value ($I_A$) of the current passing between the first and second lines and the polarity of the voltage applied between the first and second lines.

Enabling the detection of a broken conductor in the harness and the like makes it possible to realize functions like those mentioned above that contribute to ensuring the operator's safety and other purposes.

For another example, according to a seventh configuration of the present invention, in the electric power control device according to the fourth or fifth configuration, preferably, the control circuit (14B) detects whether or not there is an abnormality in the harness, whether or not there is an abnormality in a circuit within the control circuit itself, or whether or not there is an abnormality in a circuit inside the first connector based on the value ($I_B$) of the current passing through the reference line.

Enabling the detection of a broken conductor in the harness and the like makes it possible to realize functions like those mentioned above that contribute to ensuring the operator's safety and other purposes.

What is claimed is:

1. An electric power control device comprising:
    a first connector connected to a second connector provided in a second appliance; and
    a control circuit provided within a first appliance that exchanges electric power with the second appliance via a harness, the control circuit being connected to the first connector via the harness,
    wherein
    the first connector includes a latching solenoid that switches connector connection, which is connection between the first and second connectors, between a locked state and an unlocked state,
    the control circuit
    outputs a predetermined first voltage to an operating coil inside the latching solenoid to bring the connector connection into the locked state, and
    outputs a predetermined second voltage to the operating coil to bring the connector connection into the unlocked state,
    the operating coil is connected between first and second lines provided in the harness,
    when a positive voltage as the first voltage is applied to the first line relative to the second line, the connector connection is brought into the locked state,
    when a negative voltage as the second voltage is applied to the first line relative to the second line, the connector connection is brought into the unlocked state,
    the control circuit has a voltage outputter that outputs one direct-current voltage or two direct-current voltages, the control circuit being operable to output the one direct-current voltage or one of the two direct-current voltages to between the first and second lines while keeping polarity of a voltage on the first line relative to the second line selectively either positive or negative,
    the first connector includes an indicator that indicates whether or not the connector connection is in the locked state, and
    the indicator is driven based on a voltage applied between the first and second lines.

2. The electric power control device according to claim 1, wherein the control circuit detects
    whether or not there is an abnormality in the harness,
    whether or not there is an abnormality in a circuit within the control circuit itself, or
    whether or not there is an abnormality in a circuit inside the first connector based on
    a value of a current passing between the first and second lines and
    polarity of a voltage applied between the first and second lines.

3. The electric power control device according to claim 2, wherein control circuit,
    detects whether or not there is an abnormality in the harness, detects whether or not there is a broken conductor or a short in the harness, detects whether or not there is an abnormality in a circuit within the control circuit itself, detects whether or not there is at least one of an abnormal output of a switching device provided in the control circuit and an abnormal output of a voltage source for the control circuit, and detects whether or not there is an abnormality in a circuit inside the first connector, detects whether or not there is a broken conductor within the first connector.

4. An electric power control device, comprising:

a first connector connected to a second, connector provided in a second appliance; and a control circuit provided within a first appliance that exchanges electric power with the second appliance via a harness, the control circuit being connected to the first connector via the harness, wherein the first connector includes a latching solenoid that switches connector connection, which is connection between the first and second connectors, between a locked state and an unlocked state, the control circuit outputs a predetermined first voltage to an operating coil inside the latching solenoid to bring the connector connection into the locking state, and outputs a predetermined second voltage to the operating coil to bring the connector connection into the unlocked state, wherein the operating coil has a set coil that brings the connector connection into the locked state in response to the first voltage being applied between a first line and a reference line inside the harness, and a reset coil that brings the connector connection into the unlocked state in response to the second voltage being applied between a second line and the reference line inside the harness, the first connector includes an indicator that indicates whether or not the connector connection is in the locked state, and the control circuit drives the indicator by supplying the indicator with the first or second voltage via a third line inside the first connector.

5. The electric power control device according to claim 4, wherein the control circuit detects whether or not there is an abnormality in the harness, whether or not there is an abnormality in a circuit within the control circuit itself, or whether or not there is an abnormality in a circuit inside the first connector based on a value of a current passing through the reference line.

6. The electric power control device according to claim 5, wherein the control circuit, detects whether or not there is an abnormality in the harness, detects whether or not there is a broken conductor or a short circuit in the harness, detects whether or not there is an abnormality in a circuit within the control circuit itself, detects whether there is at least one of an abnormal operation of a switching device provided in the control circuit and an abnormal output of a voltage source for the control circuit, and detects whether or not there is an abnormality in a circuit inside the first connector, detects whether or not there is a broken conductor within the first connector.

* * * * *